(12) United States Patent  
Yamada et al.

(10) Patent No.: US 7,878,592 B2
(45) Date of Patent: Feb. 1, 2011

(54) SEAT APPARATUS FOR VEHICLE

(75) Inventors: Yukifumi Yamada, Toyota (JP); Hiroyuki Okazaki, Chiryu (JP); Kazuya Iwasa, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 262 days.

(21) Appl. No.: 12/042,007

(22) Filed: Mar. 4, 2008

(65) Prior Publication Data

US 2008/0224518 A1 Sep. 18, 2008

(30) Foreign Application Priority Data

Mar. 14, 2007 (JP) .............................. 2007-064944
Apr. 26, 2007 (JP) .............................. 2007-117403

(51) Int. Cl.
*B60N 2/04* (2006.01)
(52) U.S. Cl. ...................... 297/334; 297/331; 297/340; 297/378.12
(58) Field of Classification Search ................. 297/331, 297/334, 336, 340, 378.1, 378.12
See application file for complete search history.

(56) References Cited

U.S. PATENT DOCUMENTS

| 4,793,649 | A | * | 12/1988 | Yamano et al. | 296/65.09 |
| 5,466,048 | A | * | 11/1995 | Fowler et al. | 297/378.12 |
| 5,641,202 | A | * | 6/1997 | Rus | 297/335 |
| 7,240,950 | B2 | | 7/2007 | Fourrey et al. | |
| 7,686,389 | B2 | * | 3/2010 | Yamada | 297/15 |
| 2008/0224518 | A1 | | 9/2008 | Yamada et al. | |
| 2010/0019526 | A1 | | 1/2010 | Wada et al. | |

FOREIGN PATENT DOCUMENTS

EP -0626290 A1 * 11/1994
JP 2006-123905 5/2006

OTHER PUBLICATIONS

U.S. Appl. No. 12/042,007, filed Mar. 4, 2008, Yamada, et al.
U.S. Appl. No. 12/118,996, filed May 12, 2008, Yamada.

* cited by examiner

*Primary Examiner*—Joseph Edell
(74) *Attorney, Agent, or Firm*—Oblon, Spivak, McClelland, Maier & Neustadt, L.L.P.

(57) ABSTRACT

A seat apparatus for a vehicle includes a first lock mechanism switching between a first locked state and a first lock-released state and a second lock mechanism switching between a second locked state and a second lock-released state. The first lock mechanism includes a restraining member and a releasing member. The restraining member restrains a pivotal movement of a seatback at a predetermined angle position, at which the seatback does not interfere with a seat cushion moving between a first position and a second position thereof, when the second lock mechanism is in the second lock-released state. The releasing member is linked to the restraining member and releases a restriction to the pivotal movement of the seatback by being moved in association with a movement of the seat cushion when the second lock mechanism is in the second lock-released state.

18 Claims, 20 Drawing Sheets

SEAT APPARATUS FOR VEHICLE

CROSS REFERENCE TO RELATED APPLICATIONS

This application is based on and claims priority under 35 U.S.C. §119 to Japanese Patent Application 2007-064944, filed on Mar. 14, 2007, and Japanese Application 2007-117403, filed on Apr. 26, 2007, the entire contents of which are incorporated herein by reference.

FIELD OF THE INVENTION

The present invention relates to a seat apparatus for a vehicle, of which a seatback is moved between a first position and a second position thereof and a seat cushion is moved between a first position and a second thereof.

BACKGROUND

As a seat apparatus for a vehicle, of which a seat cushion and a seatback are tilted to a vehicle floor and retracted, JP2006-123905A (hereinafter, referred to as reference 1) discloses a seat apparatus of which a seatback and a seat cushion are operated by a link mechanism. The link mechanism includes a first connecting rod and a guide mechanism having a guide member. The first connecting rod is securely hinged to a vehicle floor and to the seatback. The guide member is secured to the vehicle floor and guides a bottom portion of the seat cushion. A rear portion of the seat cushion is assembled relatively pivotable to the bottom portion of the seatback. Further, the link mechanism includes a connection piece which is movably assembled relative to the vehicle floor and is hinged to a front portion of the seat cushion. The link mechanism is moved in association with the seatback and the seat cushion, so that the seatback and the seat cushion can be retracted. Therefore, when a reclining angle of the seatback is adjusted, a position of the seat cushion is also changed and furthermore, a seating posture of an operator (occupant) may be changed in accordance with a change of the position of the seat cushion.

However, according to the above described retractable seat apparatus for a vehicle, the seatback and the seat cushion are connected with each other via the link mechanism. Therefore, the seatback and the seat cushion may interfere with one another at the position where they are connected, and a smooth retraction of the seatback and the seat cushion may be interrupted. Further, the seat cushion and the seatback are restrained by the link mechanism. Therefore, a moving distance of the seatback and the seat cushion may be also restrained.

In view of the above described circumstances, a seat apparatus, of which a seat cushion and a seatback are not connected with each other by a link mechanism and are retracted to a retracted position by moving the same independently from each other, may be proposed. In such a case, however, the seat cushion and the seatback may interfere with each other in respective movement paths, and therefore a movement of each member may be interrupted. Accordingly, there may be a requirement for adjusting timing for moving the seat cushion and the seatback so that those components may not interfere with one another while being moved.

A need thus exists for a seat apparatus for a vehicle which is not susceptible to the drawback mentioned above.

SUMMARY OF THE INVENTION

According to an aspect of the present invention, a seat apparatus for a vehicle includes a first lock mechanism and a second lock mechanism. The first lock mechanism switches between a first locked state, in which a seatback being pivotable between a first position and a second position of the seatback relative to a vehicle floor is retained at a predetermined reclined position relative to the vehicle floor, and a first lock-released state, in which the seatback is allowed to pivotally move between the first position and the second position thereof relative to the vehicle floor. The second lock mechanism switches between a second locked state, in which a seat cushion being movable between a first position and a second position of the seat cushion relative to the vehicle floor is retained at a predetermined position relative to the vehicle floor, and a second lock-released state, in which the seat cushion is allowed to move between the first position and the second position thereof relative to the vehicle floor. The first lock mechanism includes a restraining member and a releasing member. The restraining member restrains a pivotal movement of the seatback at a predetermined angle position, at which the seatback does not interfere with the seat cushion moving between the first position and the second position thereof, when the second lock mechanism is in the second lock-released state. The releasing member is linked to the restraining member and releases a restriction to the pivotal movement of the seatback by being moved in association with a movement of the seat cushion when the second lock mechanism is in the second lock-released state.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
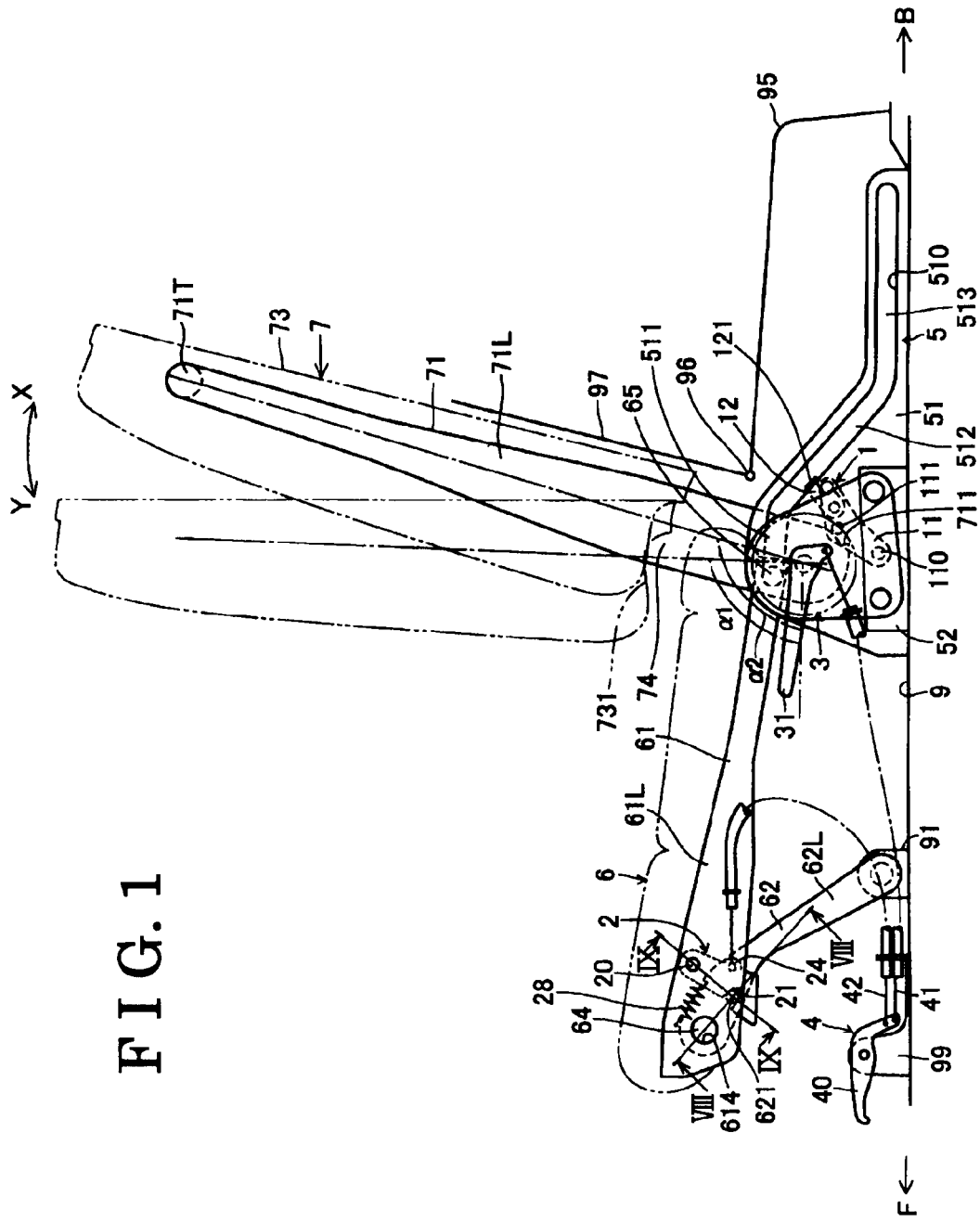
FIG. 1 is a side view illustrating a seat apparatus for a vehicle in a state where each of a seat cushion and a seatback is in a first position, according to a first embodiment.
Figure 2:
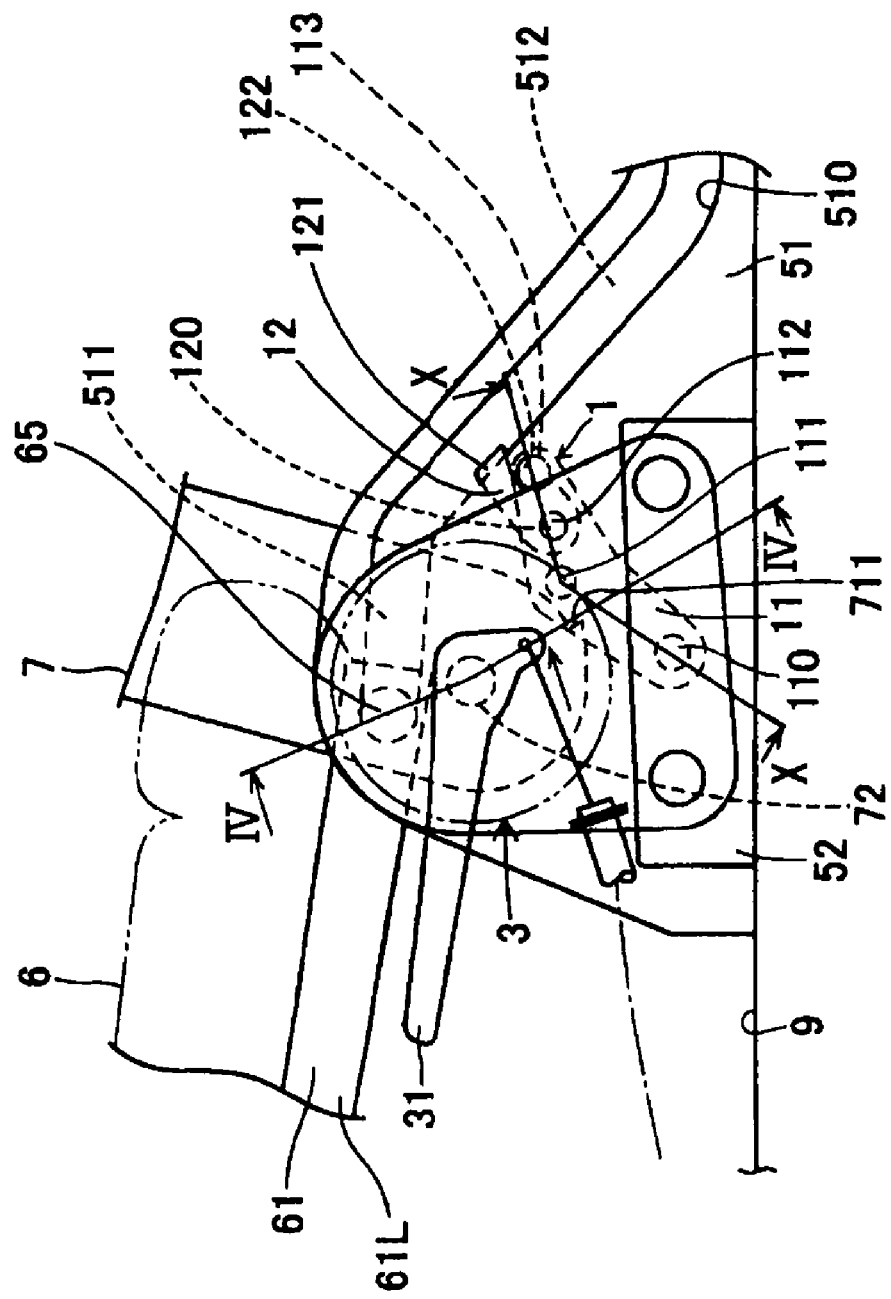
FIG. 2 is a partial enlarged side view illustrating a first lock mechanism of a seatback according to the first embodiment.

A first embodiment of the present invention will be described hereinafter with reference to the attached drawings. A seat apparatus for a vehicle applied to the present invention is employed for moving a seat cushion 6 between a seating position and a retracted position thereof (serving as a first position and a second position of the seat cushion), and for moving a seatback 7 between a seating position and a retracted position thereof (serving as a first position and a second position of the seatback). When the seat cushion 6 and the seatback 7 are disposed at the corresponding seating position, an operator (occupant) is allowed to be seated on the seat cushion 6 (see FIG. 1). On the other hand, when the seat cushion 6 and the seatback 7 are disposed at the corresponding retracted position, the seatback 7 is tilted down to a vehicle floor 9 and the seat cushion 6 and the seatback 7 are retracted, or accommodated, relative to the vehicle floor 9 (see FIG. 3). As illustrated in FIGS. 1 and 2, the seat apparatus for the vehicle includes a reclining mechanism 3, a link mechanism 62, a link-lock member 2, an interference-avoiding mechanism 1 and an operation portion 4. The reclining mechanism 3 adjusts the seatback 7 to a reclining angle within a predetermined range. The interference-avoiding mechanism 1 switches between a locked state (first locked state), in which the seatback 7 is retained at a predetermined reclined position relative to the vehicle floor 9, and a lock-released state (serving as a first lock-released state), in which the seatback 7 is allowed to pivotally move between the seating position and the retracted position thereof relative to the vehicle floor 9. More specifically, the interference-avoiding mechanism 1 temporally restrains the seatback 7 to a non-interfering position, where the seatback 7 does not interfere with the seat cushion 6, when the seatback 7 and the seat cushion 6 are moved to the corresponding retracted position. Further, the interference-avoiding mechanism 1 releases a restriction to the seatback 7 when the seat cushion 6 reaches a position where the seat cushion 6 does not interfere with the seatback 7 being pivoted to be retracted to the retracted position thereof. The interference-avoiding mechanism 1 serves as a first lock mechanism. The link mechanism 62 allows the seat cushion 6 to move between the seating position and the retracted position thereof. The link-lock member 2 retains the seat cushion 6 at a predetermined position and releases the seat cushion 6 from the predetermined position. More specifically, the link-lock member 2 switches between a locked state (second locked state), in which the seat cushion 6 is retained at the predetermined position relative to the vehicle floor 9, and a lock-released state (second lock-released state), in which the seat cushion 6 is allow to move between the seating position and the retracted position thereof relative to the vehicle floor 9. The link-lock member 2 serves as a second lock mechanism. The operation portion 4 operates the interference-avoiding mechanism 1 and the link-lock member 2 so that the seatback 7 and the seat cushion 6 are retracted. Additionally, when the operator is seated on a seat for the vehicle, a left direction of the operator is referred to as a left side (left direction) L and a right direction of the operator is referred to as a right side (right direction) R. In the same manner, a frontward direction of the operator is referred to as a front side (frontward direction) F and a backward direction of the operator is referred to as a back side (backward direction) B.

Figure 4:
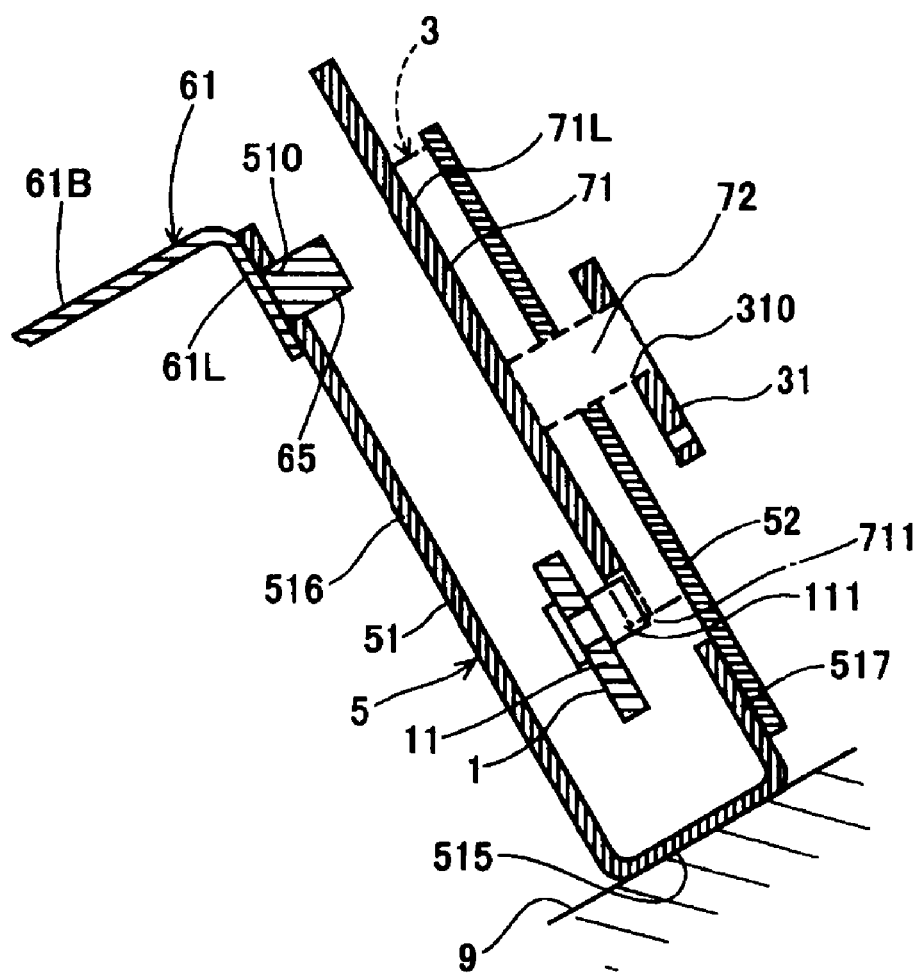
FIG. 4 is a partial sectional view taken along line IV-IV in FIG. 2, illustrating the first lock mechanism of the seatback according to the first embodiment.

As illustrated in FIG. 4, the seatback 7 includes an inverted U-shaped back frame 71 configured by a left frame 71L, an upper frame 71T and a right frame (not illustrated). A lower end of the left frame 71L is pivotably connected to a left securing-side bracket 5, and a lower end of the right frame is pivotably connected to a right securing-side bracket 5. The left and right securing-side brackets 5 are secured to the vehicle floor 9 via the reclining mechanism 3 which is generally known. Then, when the reclining mechanism 3 is operated by an operation of a reclining lever 31, as will be described later, the seatback 7 is pivoted between the seating position where the operator is allowed to be seated and the retracted position.

As is apparent from FIGS. 1 and 2, a protruding portion 711 protrudes at the lower end of the left frame 71L of the seatback 7. The protruding portion 711 is engageable with the interference-avoiding mechanism 1. When the seatback 7 is pivoted towards the retracted position thereof and the reclining angle of the seatback 7 is changed to a forward tilted angle α1, the protruding portion 711 of the seatback 71 makes contact with an engagement portion 111 of the interference-avoiding mechanism 1, which will be described later. The forward tilted angle α1 serves as a predetermined angle position.

Further, the seatback 7 includes a cushion 73 and a space portion 74. The cushion 73 is secured at an upper portion of the back frame 71. The space portion 74 is surrounded by the back frame 71 (the left frame 71L, the upper frame 71T and the right frame) and is opened at a lower portion of the cushion 73. The space portion 74 includes sufficient space so that the seat cushion 6 is allowed to pass therethrough when the seat cushion 6 is moved between the seating position and the retracted position thereof.

The aforementioned reclining mechanism 3, which is generally known, includes a spring (not illustrated) for biasing the seatback 7 to be forwardly tilted and a reclining lever 31, for example. When the reclining lever 31 of the reclining mechanism 3 is pulled upwardly, a locking mechanism is released and the seatback 7 is allowed to be tilted backwardly against biasing force of the spring by force for rotating the seatback backwardly. When the reclining lever 31 is released (not operated), the locking mechanism is operated and the seatback 7 is securely disposed at an adjusted position.

In addition, the locking mechanism of the generally known reclining mechanism 3 is structured with an upper arm, a pole and a cam member. The upper arm is supported to the seatback 7 and includes inner teeth. The pole is radially movably supported to the securing-side brackets 5 and its end portion is provided with outer teeth which are engaged with and disengaged from the inner teeth of the upper arm. The cam member is pivoted by the reclining lever 31 via a pivot shaft 72 so as to radially move the pole. When the reclining lever 31 is pulled, the inner teeth of the upper arm are moved inwardly and therefore an engagement between the inner teeth of the upper arm and the outer teeth of the pole is released. This in turn allows the reclining angle of the seatback 7 to be adjusted. When the reclining lever 31 is returned, the pole is moved radially outwardly and returned by the biasing force of the spring which is not illustrated. Then, the outer teeth of the pole are engaged with the inner teeth of the upper arm and therefore the seatback 7 is locked at a predetermined angle. Additionally, the pivot shaft 72 serves as a pivot center of the seatback 7.

Figure 5:
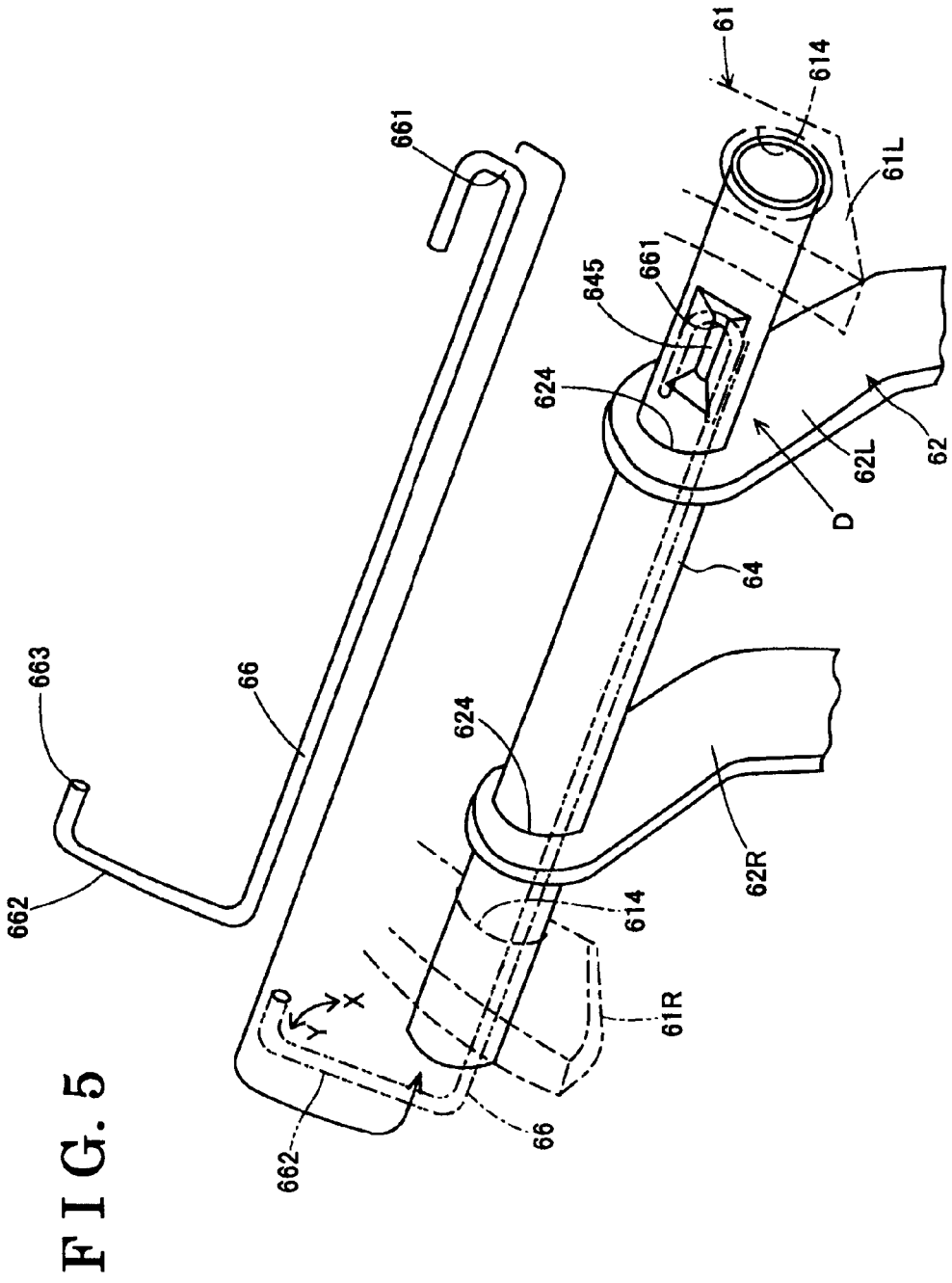
FIG. 5 is a perspective view illustrating a torsion bar inserted with a torque rod.

As illustrated in FIGS. 1 and 5, the seat cushion 6 is mounted on the floor 9 so as to be movable between the seating position and the retracted position. The seat cushion 6 includes a U-shaped cushion frame 61, the link mechanism 62 and a torque rod 64. The cushion frame 61 is configured by a left frame 61L, a right frame 61R and a back frame 61B (see FIG. 4). The link mechanism 62 is connected to the cushion frame 61 and allows the seat cushion 6 to move. The torque rod 64 is connected to the link mechanism 62 and applies rotational torque thereto.

As illustrated in FIG. 5, the link mechanism 62 includes link members 62L and 62R, which are relatively pivotably connected to the left frame 61L and the right frame 61R, respectively. A lower end of each of the link members 62L and 62R is pivotably supported to a floor-side secured member 91 which is secured to the vehicle floor 9. An upper portion of each of the link members 62L and 62R is formed with a rod hole 624 (see FIGS. 3 and 5), and the torque rod 64 is inserted therethrough. The rod holes 624 of the link members 62L and 62R are unrotatably secured to the torque rod 64 for example by welding. The left and right frames 61L and 61R of the cushion frame 61 are formed with pivot holes 614, respectively. Left and right ends of the torque rod 64 (the left and right ends arranged axially farther outwardly than the link members 62L and 62R) are inserted into the left pivot hole 614 of the left frame 61L and the right pivot hole 614 of the right frame 61R, respectively. Hence the torque rod 64 is pivotably supported to the left and right frames 61L and 61R of the cushion frame 61.

Figure 6:
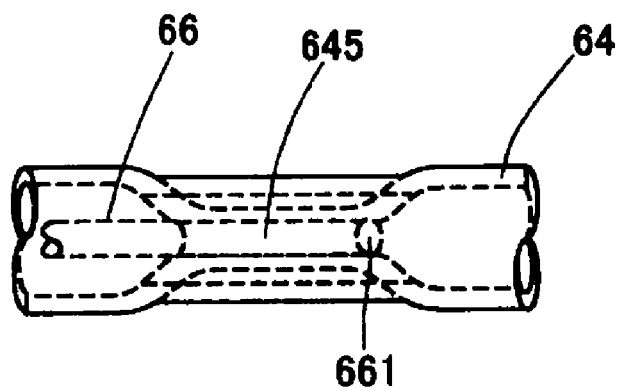
FIG. 6 is an explanatory view seen from an arrow D in FIG. 5, illustrating a manner for securing the torsion bar in the torque rod.
Figure 7:
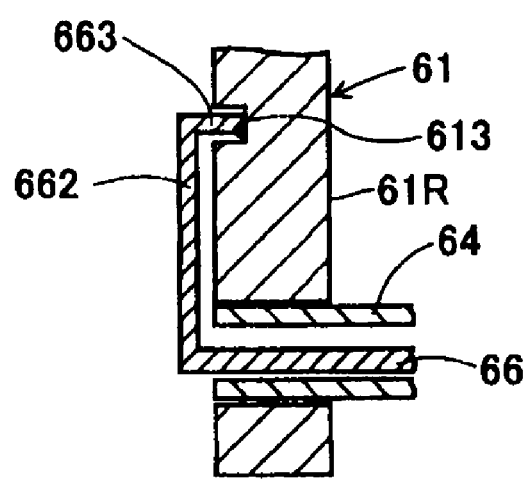
FIG. 7 is a partial cross sectional view illustrating a cushion frame engaged with the torsion bar.

As illustrated in FIGS. 5, 6 and 7, the torque rod 64 is a pipe member, and a torsion bar 66 is inserted through an inner hollow portion of the torque rod 64. One end of the torsion bar 66 includes a bent portion 661, which is bent in a U-shape and is secured at a pressed portion 645 provided in the torque rod 64 (FIG. 6). Another end of the torsion bar 66 includes a L-shaped portion 662, which is bent in an L-shape and extends along an outer side-surface of the right frame 61R of the cushion frame 61. With reference to FIG. 7, an end of the L-shaped portion 662 is formed with a locking portion 663, and the locking portion 663 is locked to a recessed portion 613 formed at the outer side surface of the right frame 61R of the cushion frame 61 under a condition where the torsion bar 66 is pivoted in a clockwise direction X, indicated with an arrow X in FIG. 5, relative to the torque rod 64. Therefore, the torsion bar 66 applies biasing force to the torque rod 64, and the biasing force rotates the torque rod 64 in the clockwise direction X relative to the cushion frame 61. Herein, the torsion bar 66 is securely attached to the torque rod 64 at the pressed portion 645. Alternatively, the torsion bar 66 may be secured to the torque rod 64 by other means such as welding, for example, so that the torque rod 64 is biased and pivoted in a rotating direction of the torsion bar 66.

Figure 8:
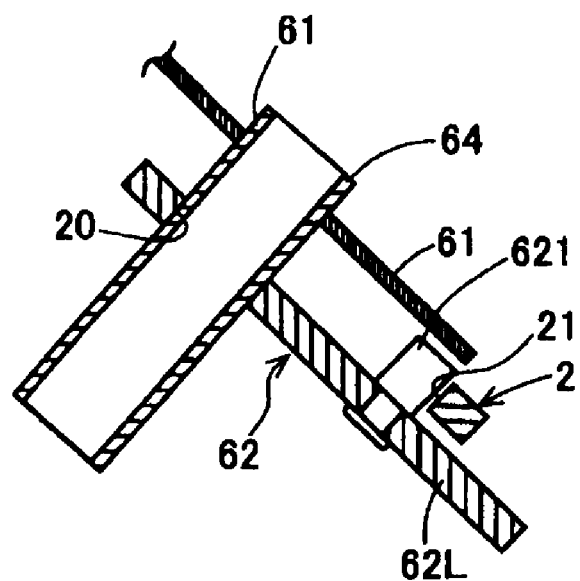
FIG. 8 is a partial cross sectional view taken along line VIII-VIII in FIG. 1, illustrating a second lock mechanism of the seat apparatus for the vehicle.
Figure 9:
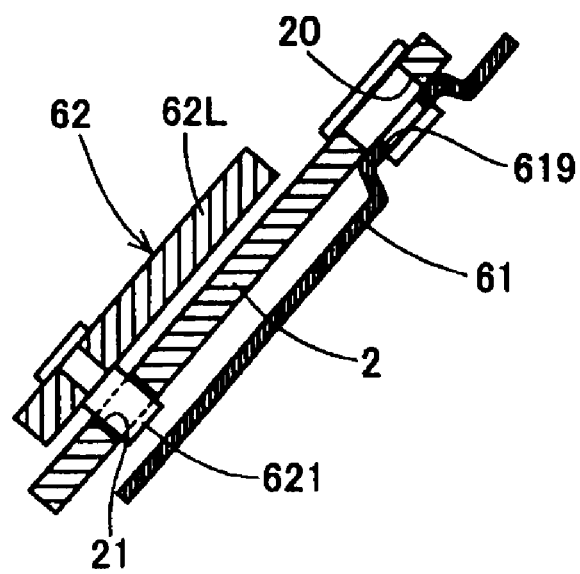
FIG. 9 is a partial cross sectional view taken along line IX-IX in FIG. 1, illustrating the second lock mechanism of the seat apparatus for the vehicle.

As illustrated in FIGS. 1, 8 and 9, the link-lock member 2, which retains the seat cushion 6 to the predetermined position, is pivotably assembled to the left frame 61L of the cushion frame 61. The link-lock member 2 includes a shaft portion 20 and an engagement-recessed portion 21. The shaft portion 20 of the link-lock member 2 is pivotably supported to the left frame 61L. The engagement-recessed portion 21 is disengageably engaged with a protruding shaft 621 protruding from an upper side surface of the link member 62L. As is illustrated in FIG. 1, one end of a lock-biasing spring 28 is secured to the link-lock member 2. Another end of the lock-biasing spring 28 is secured to the cushion frame 61 and biases the link-lock member 2 in a direction where the protruding shaft 621 of the link-lock member 62 is engaged with the engagement-recessed portion 21 of the link-lock member 2. Further, the link-lock member 2 is formed with a cable connecting portion 24 at a backside of a rim portion, which is an opposite side relative to a front side of the rim portion formed with the engagement-recessed potion 21. The cable connecting portion 24 is connected with a link-lock release cable 42 of the operation portion 4.

Figure 10:
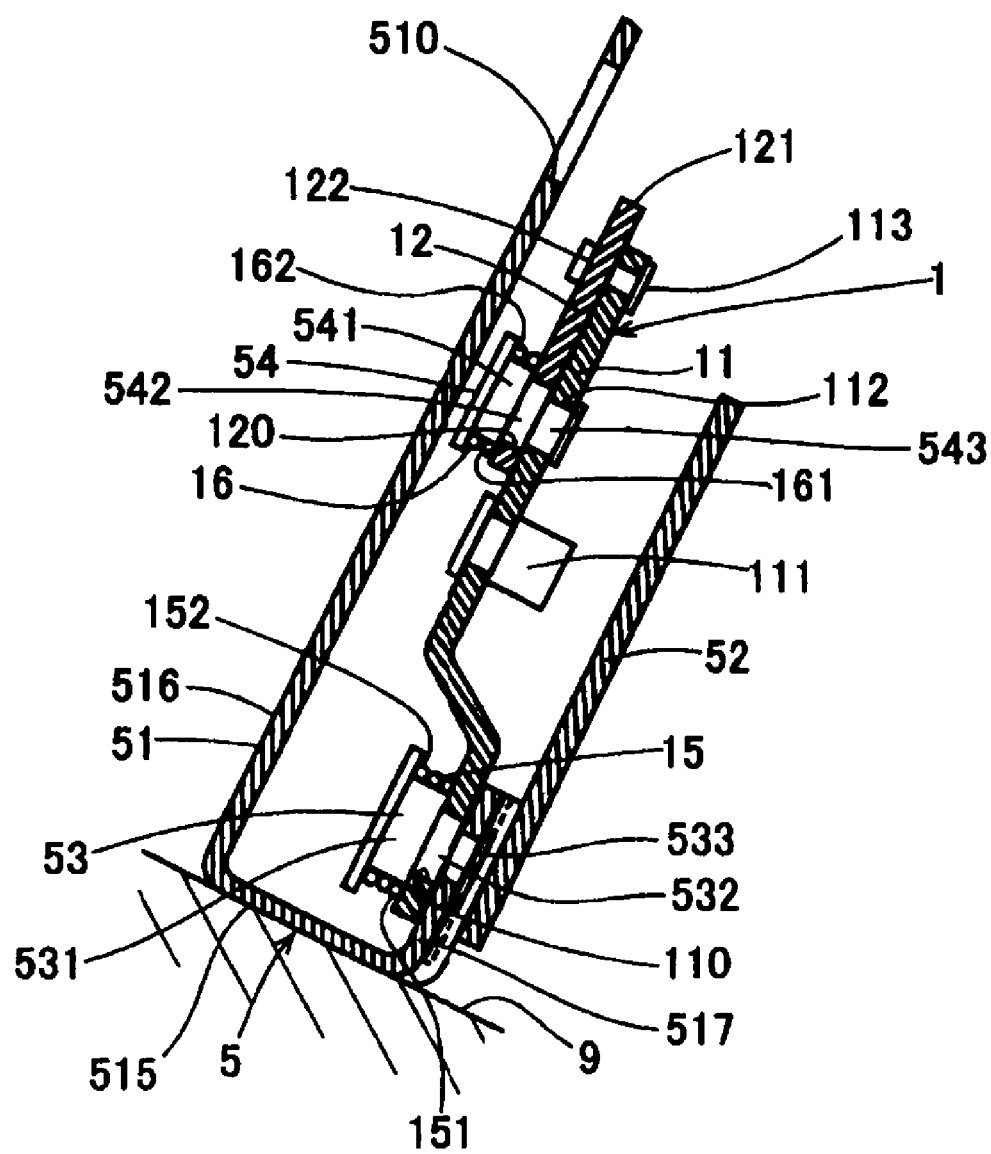
FIG. 10 is a partial cross sectional view taken along line X-X in FIG. 2, illustrating the first lock mechanism of the seatback according to the first embodiment.

As illustrated in FIGS. 1, 4 and 10, a pair of the securing-side brackets 5 (left and right securing-side brackets) is secured on the vehicle floor 9. The securing-side brackets 5 are provided at the backward side B of the seat cushion 6 and at a left and right sides of a lower portion of the seatback 7, respectively. Each of the securing-side brackets 5 includes a guide wall member 51 and a vertical wall member 52. The guide wall member 51 is arranged in an upright state on the floor 9 and extends in the backward direction B of the seatback 7. The vertical wall member 52 is secured to the guide wall member 51. The guide wall member 51 of the securing-side bracket 5 includes a connecting portion 515, a guide wall 516 and an outer wall 517. The connecting portion 515 contacts the vehicle floor 9 and is bolted thereto. Further, the connecting portion 515 is disposed between the guide wall 516 and the outer wall 517, which are arranged vertically (uprightly) relative to the vehicle floor 9. The guide wall 516 of the securing-side bracket 5 includes a guide hole 510 which guides a guiding protrusion 65 provided at a back portion of the cushion frame 61. The guide hole 510 defines a movement path (serving as a path for the seat cushion 6), on which the guiding protrusion 65 is moved between a seating position and a retracted position thereof (serving as a first position and a second position of the guiding protrusion). Herein, when the seat cushion 6 is located at the seating position, the guiding protrusion 65 is located at the seating position thereof, and when the seat cushion 6 is located at the retracted position, the guiding protrusion 65 is positioned at the retracted position thereof. A front portion 511 (which is best shown in FIG. 2) of the guide hole 510 is positioned slightly upwardly away from the vehicle floor 9. Further, the guide hole 510 includes an inclined portion 512 and an accommodating portion 513. The inclined portion 512 allows the back portion of the cushion frame 61 to move gradually downwardly as being moved backwardly. When the back portion of the cushion frame 61 is moved farther backwardly, the accommodating portion 513 extending in parallel with the vehicle floor 9 guides the back portion of the cushion frame 61 so that the back portion of the cushion frame 61 approaches the vehicle floor 9. A form of the guide hole 510 is configured to move the seat cushion 6 so that the seat cushion 6 does not interfere especially with a lower portion 731 of the cushion 73 of the seatback 7 when the seat cushion 6 is moved between the seating position and the retracted position thereof. The outer wall 517 of the guide wall member 51 is securely connected with the vertical wall member 52.

Figure 3:
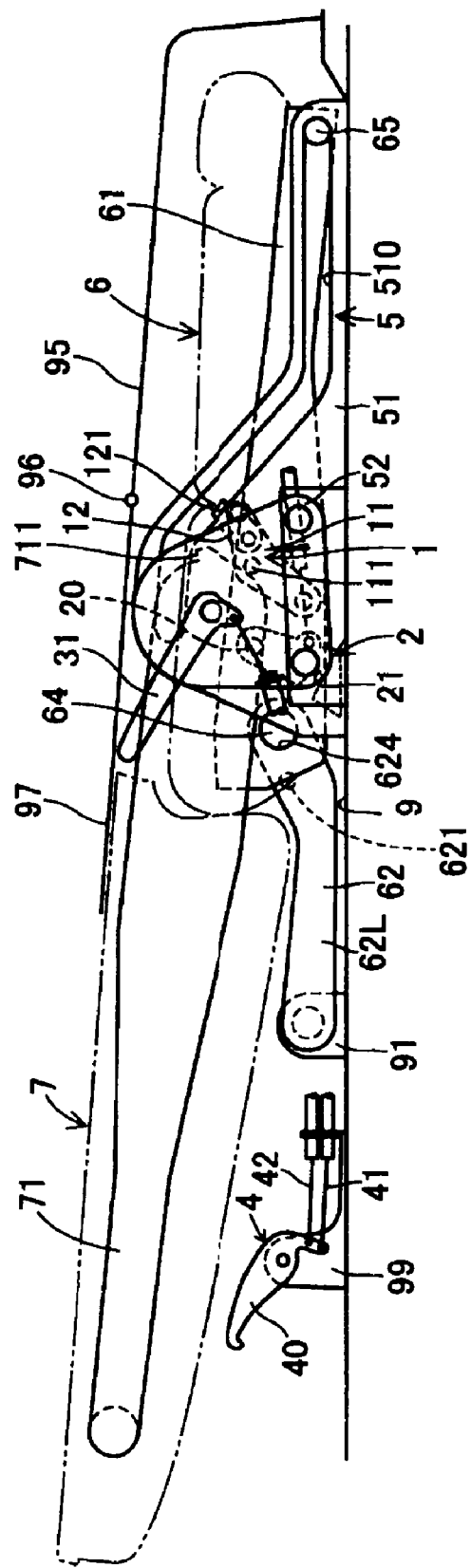
FIG. 3 is a side view illustrating the seat apparatus for the vehicle in a state where each of the seat cushion and the seatback is in a second position, according to the first embodiment.

As best shown in FIGS. 3 and 4, a lower portion of the back frame 71 (of the left frame 71L), the reclining mechanism 3 and the interference-avoiding mechanism 1 are accommodated in the securing-side bracket 5 provided at the left side L of the seat. Further, as illustrated in FIG. 10, the interference avoiding mechanism 1 is supported to the outer wall 517 of the guide wall member 51 by means of a pin 53. The pin 53 includes a top portion 531, an intermediate portion 532 and a bottom portion 533. A torsion coil spring 15 is wound around the top portion 531 of the pin 53. The intermediate portion 532 of the pin 53 is pivotably inserted through a pivot hole 110 formed at a restraining member 11 of the interference-avoiding mechanism 1. The bottom portion 533 of the pin 53 is secured to the outer wall 517 of the guide wall member 51. One end 151 of the torsion coil spring 15 is securely connected to the restraining member 11 of the interference-avoiding mechanism 1 and another end 152 of the torsion coil spring 15 is securely connected to the top portion 531 of the pin 53. The restraining member 11 of the interference-avoiding mechanism 1 is biased in a counterclockwise direction Y, which is indicated with an arrow Y in FIG. 1 (i.e., in a direction towards the viewer referring to FIG. 10), by the torsion coil spring 15 and contacts the lower portion of the back frame 71.

The interference-avoiding mechanism 1 includes the restraining member 11 and a releasing member 12. The restraining member 11 restrains a pivotal movement of the seatback 7 at the non-interfering position, where the seatback 7 does not interfere with the seat cushion 6 when the link-lock member 2 is in the lock-released state (second lock released state). The releasing member 12 is linked to the restraining member 11 and releases a restriction to the pivotal movement of the seatback 7 by being moved in association with a movement of the seat cushion 6 when the link-lock member 2 is in the lock-released state (second lock-released state). The restraining member 11 is fitted with the intermediate portion 532 of the pin 53 at the pivot hole 110 and is pivotably supported to the outer wall 517 of the guide wall member 51. The restraining member 11 includes the engagement portion 111, a supporting portion 112 and a locking portion 113. The engagement portion 111 protrudes so as to be engaged with and disengaged from the protruding portion 711 of the back frame 71. The supporting portion 112 pivotably retains the releasing member 12. The locking portion 113 locks the releasing member 12.

As best shown in FIG. 10, the releasing member 12 is formed with a pivot hole 120 and an intermediate portion 542 of a pin 54 is inserted through the pivot hole 120, therefore the releasing member 12 is supported pivotably relative to the restraining member 11. The releasing member 12 includes a locked portion 122 and a contacting portion 121. The locked portion 122 is locked, or securely connected, to the locking portion 113 of the restraining member 11. The contacting portion 121 protrudes to the movement path for the seat cushion 6 moving between the seating position and the retracted position thereof so as to be forwardly and backwardly movable along the movement path, and is contactable with the guiding protrusion 65 of the cushion frame 61. The pin 54 includes a top portion 541 around which the torsion coil spring 16 is wounded, the intermediate portion 542 inserted through the pivot hole 120 of the releasing member 12, and a bottom portion 543 securely connected to the supporting portion 112 of the restraining member 11, in the same manner as the pin 53. One end 161 of the torsion coil spring 16 is securely connected to the releasing member 12, and another end 162 of the torsion coil spring 16 is securely connected to the top portion 541 of the pin 54. The releasing member 12 is biased in the clockwise direction X illustrated in FIG. 1 (i.e., in a direction away from the viewer referring to FIG. 10) by means of the torsion coil spring 16, and therefore the locked portion 122 of the releasing member 12 contacts the locking portion 113 of the restraining member 11.

The connecting portion 121 of the releasing member 12 operates the interference-avoiding mechanism 1 by being pressed by the guiding protrusion 65 of the cushion frame 61. Then, the connecting portion 121 of the releasing member 12 releases an engagement between the engagement portion 111 of the restraining member 11 and the protruding portion 711 of the back frame 71, and therefore the seatback 7 is forwardly tilted from the forward tilted angle α1 corresponding to the non-interfering position. Accordingly, the seat cushion 6 is moved to the retracted position in the backward direction B while the seatback 7 is tilted down from the forward tilted angle α1 to the retracted position corresponding to a parallel state, where the seatback 7 is arranged to be in parallel with the vehicle floor 9. Thus, a position of the connecting portion 121 of the releasing member 12 is set so that the seatback 7 and the seat cushion 6 do not interfere with each other.

As illustrated in FIG. 1, the operation portion 4 includes an operation lever 40, a lock-release cable 41 and the link-lock release cable 42. The operation lever 40 is pivotably supported by a bracket 99 which is secured on the vehicle floor 9. One end of the lock-release cable 41 is connected to the operation lever 40 and another end of the lock-release cable 41 is connected to the reclining lever 31 of the reclining mechanism 3. Further, the engagement release lever 41 allows the locking mechanism of the reclining mechanism 3 to be released by an operation of the operation lever 40. On the other hand, one end of the link-lock release cable 42 is connected to the operation lever 40 and another end of the link-lock release cable 42 is connected to the link-lock member 2. Further, the link-lock release lever 42 allows a lock of the link-lock member 2 to be released by the operation of the operation lever 40.

Back to FIG. 1, a deck board 95 for accommodating the seat cushion 6 is provided on the floor 9 and at the backside B of the seatback 7. Further, the deck board 95 is assembled with a cover 97 at its opened side (an opened end) via a hinge 96. The cover 97 is engaged with a back portion of the seatback 7 and is pivoted in accordance with the pivotal movement of the seatback 7.

Next, an operation of the seat apparatus for the vehicle will be described hereinafter. Firstly, as illustrated in FIG. 1, the seating positions of the seat cushion 6 and the seatback 7 will be described. When the seat cushion 6 is located at the seating position thereof, the seat cushion 6 is retained at the front side F of a vehicle body by the link mechanism 62. A protruding shaft 621 of the left link member 62L of the link mechanism 62 is engaged with the engagement-recessed portion 21 of the link-lock member 2 and therefore restraining the left link member 62L from being pivoted in the clockwise direction X relative to the left cushion frame 61L. The guiding protrusion 65, which is provided at the left side and at the backside of the cushion frame 61, is positioned at a farther frontward side (i.e., in the frontward direction F) than the connecting portion 121 of the releasing member 12 of the interference-avoiding mechanism 1. As illustrated in FIG. 2, the guiding protrusion 65 of the cushion frame 61 is disposed into the front portion 511 of the guide hole 510 of the securing-side bracket 5, and therefore the seat cushion 6 is retained to be upwardly away from the vehicle floor 9. In addition, when the seatback 7 is positioned at the seating position thereof, the seatback 7 is retained at a predetermined angle α2 by means of the reclining mechanism 3.

Figure 11:
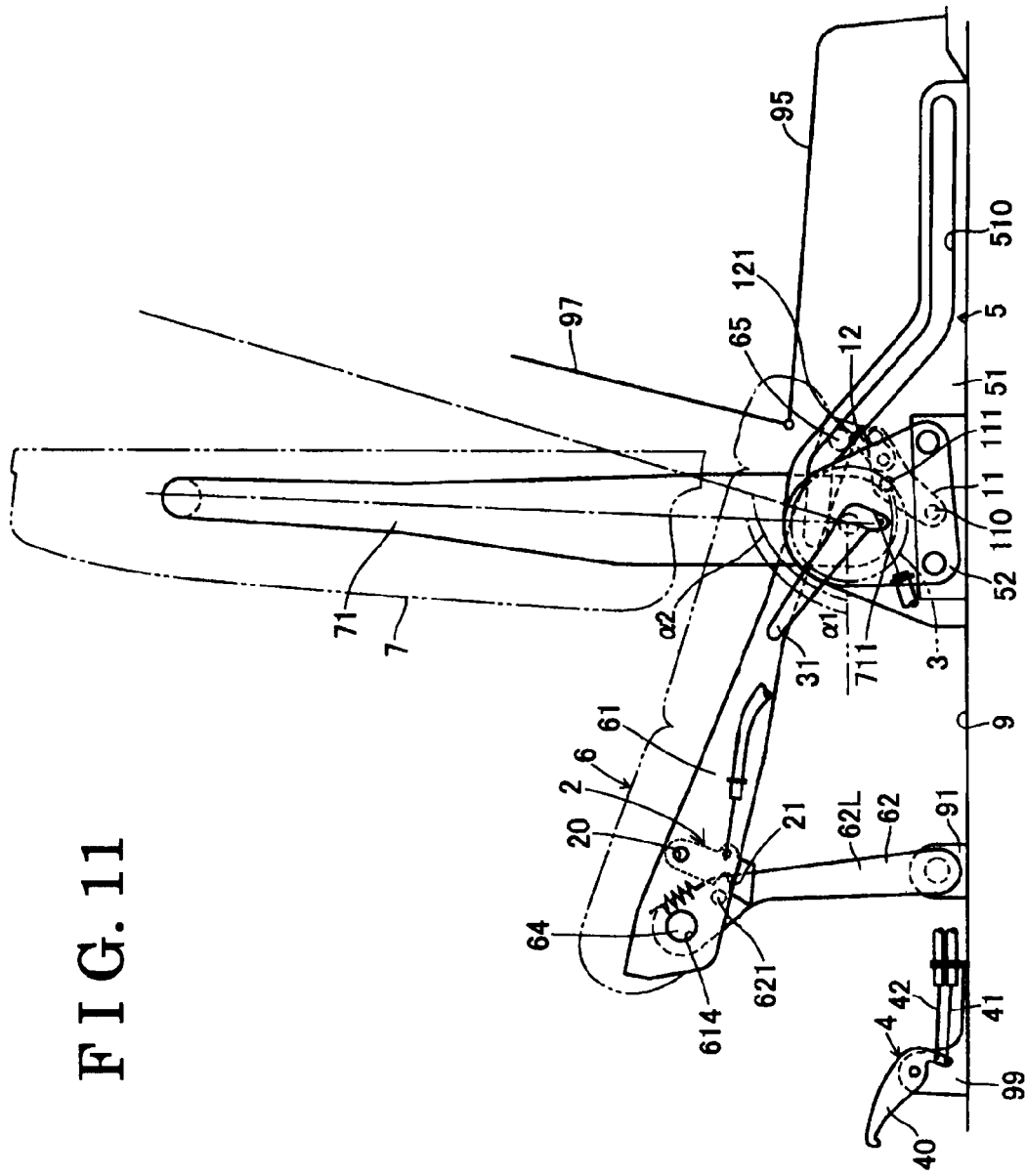
FIG. 11 is a side view illustrating a locked state of the seatback, according to the first embodiment.

When retracting the seat cushion 6 and the seatback 7 to the corresponding retracted position, the operation lever 40 (illustrated in FIG. 1) is pulled upwardly. Then, the lock-release cable 41 and the link-lock release cable 42, which are connected to the back portion of the operation lever 40, are pulled in the frontward direction F. The lock-release cable 41 pulls up the reclining lever 31. Then, as illustrated in FIG. 11, the seatback 7 is reclined in a forward tilting direction (i.e., the counterclockwise direction Y) by a spring (not illustrated). When the seatback 7 is tilted and the reclining angle thereof reaches the forward tilted angle α1, the protruding portion 711 protruding in a radially outward direction of the back frame 71 is engaged with the engagement portion 111 provided at the restraining member 11 of the interference-avoiding mechanism 1, and the pivotal movement of the seatback 7 is temporally restrained at the forward tilted angle α1.

Further, the link-lock release cable 42 draws (pulls) the link-lock member 2 in the counterclockwise direction Y against the biasing force of the lock-biasing spring 28. Hence the engagement-recessed portion 21 of the link-lock member 2 is released from the protruding shaft 621 of the left link member 62L. Then, the link members 62L and 62R, which are secured to the torque rod 64, are pivoted in the clockwise direction X relative to the cushion frame 61, i.e., in a direction where an angle between the cushion frame 61 and the left link member 62L (right link member 62R) is enlarged, in accordance with the biasing force of the torsion bar 66 in the clockwise direction X. Therefore, the cushion frame 61 is moved in the backward direction B, and the guiding protrusion 65 protruding at the back portion of the cushion frame 61 is guided by the guide hole 510 of the guide wall portion 51, so that the guiding protrusion 65 is moved in the backward direction B from the front portion 511 to the inclined portion 512 of the guide hall 510. This in turn allows the seat cushion 6 to be moved gradually in the backward direction B from the seating position.

Then, when the guiding protrusion 65 reaches the inclined portion 512 of the guide hole 510, the guiding protrusion 65 makes contact with the connecting portion 121 of the releasing member 12 of the interference-avoiding mechanism 1, the connecting portion 121 which protrudes to the inclined portion 512, and presses the releasing member 12 in the backward direction B. The releasing member 12 is moved in the backward direction B and rotates the restraining member 11 in the clockwise direction X while being engaged with the locking portion 113 of the restraining member 11. The engagement portion 111 formed at the restraining member 11 is released from the protruding portion 711 of the back frame 71 by such pivotal movement of the restraining member 11. Accordingly, a restriction on the pivotal movement of the seatback 7 at the forward tilted angle α1 (i.e., at the non-interfering position) is released. As illustrated in FIG. 3, the seatback 7 is pivoted in the counterclockwise direction Y from the forward tilted angle α1 to the retracted position corresponding to the parallel state by biasing force of a non-illustrated biasing member acting in the counterclockwise direction Y. While the seatback 7 is pivoted from the forward tilted angle α1 to the retracted position corresponding to the parallel state, the guiding protrusion 65b of the cushion frame 61 is guided by the guide hole 510 hence moving the cushion frame 61 to the non-interfering position located at the backward side B. Accordingly, the seatback 7 and the seat cushion 6 do not interfere with each other.

As illustrated in FIG. 3, the seat cushion 6 presses the contacting portion 121 thereby moving the releasing member 12, and therefore the contacting portion 121 of the releasing member 12 is moved backwardly in the guide hole 510. Accordingly, the seat cushion 6 is moved in the farther backward direction B. The seat cushion 6 gradually approaches the vehicle floor 9 and is arranged to be parallel with the vehicle floor 9. Then, the seat cushion 6 is accommodated, or retracted, into the deck board 95 provided on the vehicle floor 9. At this time, the cover 97, which is hinged at the opening portion of the deck board 95 via the hinge 96, is locked to the back portion of the seatback 7. Therefore, the seatback 7, the deck board 95 and the cover 97 form an approximately coplanar surface.

Next, when moving the seatback 7 and the seat cushion 6 from the corresponding retracted position to the corresponding seating position, the operator firstly lifts up the seatback 7 being in the parallel state for example with his/her hand, so that the reclining angle of the seatback 7 is larger than the forward tilted angle α1 (i.e., the seatback 7 is arranged in the upright state). In such upright state of the seatback 7, the pole (not illustrated) of the reclining mechanism 3 is moved radially outwardly and the outer teeth of the pole and the inner teeth of the upper arm (not illustrated) are engaged with one another. Thus, the seatback 7 is retained at the seating position where the operator is allowed to be seated by means of the reclining mechanism 3.

Next, the operator pulls (draws) the seat cushion 6 in the frontward direction F. At this time, the operator pulls the seat cushion 6 with force being greater than the biasing force of the torsion bar 66 inserted in the torque rod 64, the biasing force acting in the backward direction B. Then, the link members 62L and 62R, which are provided at the front portion of the cushion frame 61, are pivoted in the counterclockwise direction Y relative to the cushion frame 61. The guiding protrusion 65 of the cushion frame 61 is guided by the guide hole 510, thus moving the back portion of the cushion frame 61 in the frontward direction F. Therefore, the seat cushion 6 is moved in the frontward direction F so as to be located at the seating position where the operator (occupant) is allowed to be seated. Thus, when the seat cushion 6 reaches the seating position thereof, the protruding shaft 621 of the link member 62L at the left side L is engaged with the engagement-recessed portion 21 of the link-lock member 2. This in turn locks the seat cushion 6 to the seating position thereof.

As described above, while the seat cushion 6 is moved from the seating position towards the retracted position thereof, the releasing member 12 is moved by being pressed by the guiding protrusion 65 of the cushion frame 61 and rotates the restraining member 11, so that the engagement between the engagement portion 111 of the restraining member 11 and the protruding portion 711 of the seatback 7 is released. Accordingly, a pivotal movement restraining state of the seatback 7 at the forward tilted angle α1 is released, and the seatback 7 is pivoted from the forward tilted angle α1 to the accommodating state corresponding to the parallel state. At this time, the seatback 6 is moved to a position for not interfering with the seatback 7 while the seatback 7 is pivoted from the forward tilted angle α1 to the retracted position. Accordingly, the seatback 7 and the seat cushion 6 are moved to the corresponding retracted position without being interfered by each other. In addition, the seat cushion 6 and the seatback 7 are not connected with each other. Therefore, the retracted positions of the seat cushion 6 and the seatback 7 may be set flexibly, i.e., a relative positional relation between the seat cushion 6 and the seatback 7 may be flexibly selected in accordance with a form of a guide member and a guiding direction, for example.

When moving the seat cushion 6 in the frontward direction F, the contacting portion 121 of the releasing member 12 is pressed in the forward direction F by the guiding protrusion 65 of the cushion frame 61, hence rotating the releasing member 12 in the frontward direction F. Because of such pivotal movement of the releasing member 12, the contacting portion 121 of the releasing member 12 is retracted from the guide hole 510 and allows the guiding protrusion 65 to pass along the guide hole 510. Therefore, the guiding protruding potion 65 of the cushion frame 61 is smoothly moved along the guide hole 510 in the frontward direction F without being interrupted by the contacting portion 121 of the releasing member 12.

Next, a second embodiment of the present invention will be described hereinafter. In the second embodiment, a contacting portion 145 of a releasing member 14 is linked to a restraining member 13 and is always positioned between the seat cushion 6 and the retracted position of the seat cushion 6 so as to be slidable along the path for the seat cushion 6. In other words, the contacting portion 145 of the releasing member 14 is provided at an area being closer to the retracted position of the seat cushion 6 than the guiding protrusion 65 provided at the back portion of the seat cushion 6 (i.e., farther backward direction B than the guiding protrusion 65) so as to be slidable in the guide hole 510. Such configuration of the seat apparatus of the second embodiment is different from that of the first embodiment.

Figure 12:
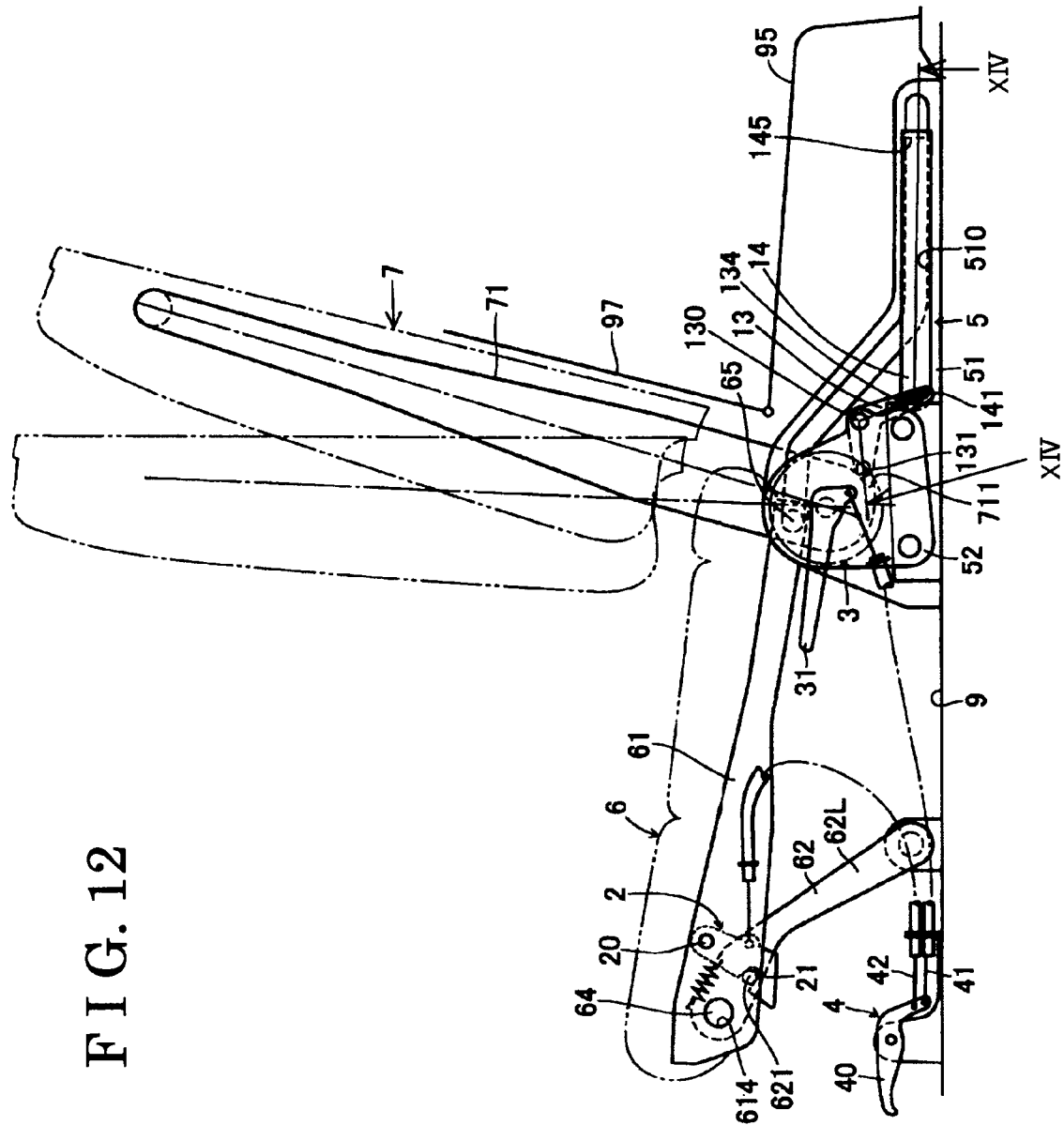
FIG. 12 is a side view illustrating the seat apparatus for the vehicle in a state where each of the seat cushion and the seatback is in the first position, according to a second embodiment.
Figure 13:
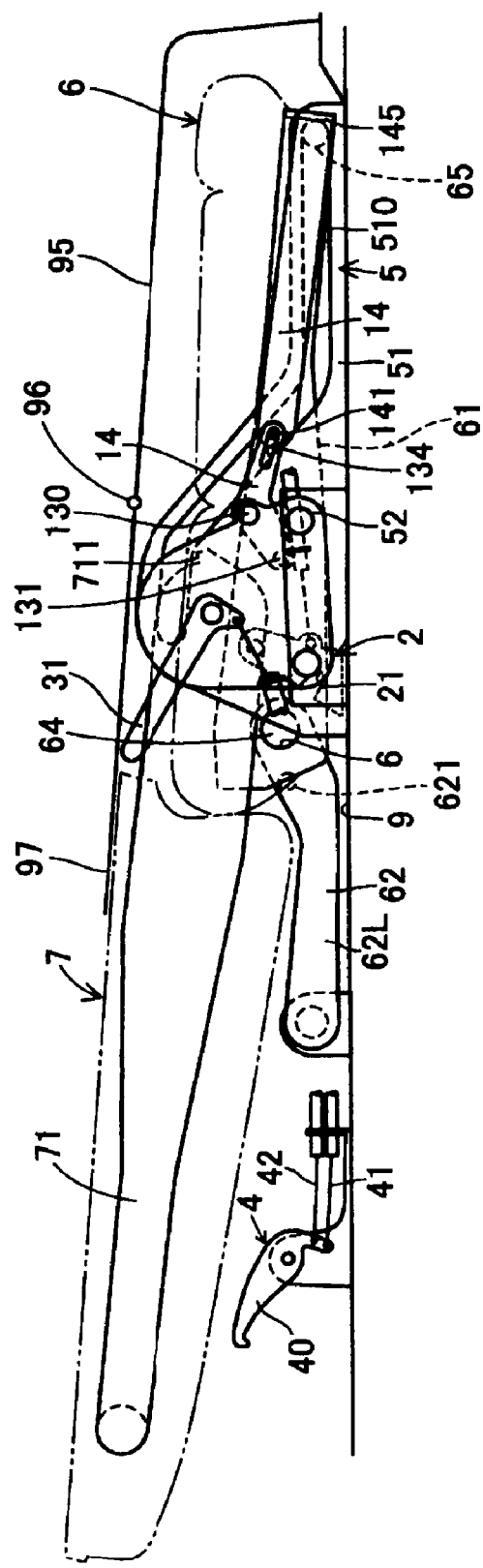
FIG. 13 is a side view illustrating the seat apparatus for the vehicle in a state where each of the seat cushion and the seatback is in the second position, according to a second embodiment.
Figure 14:
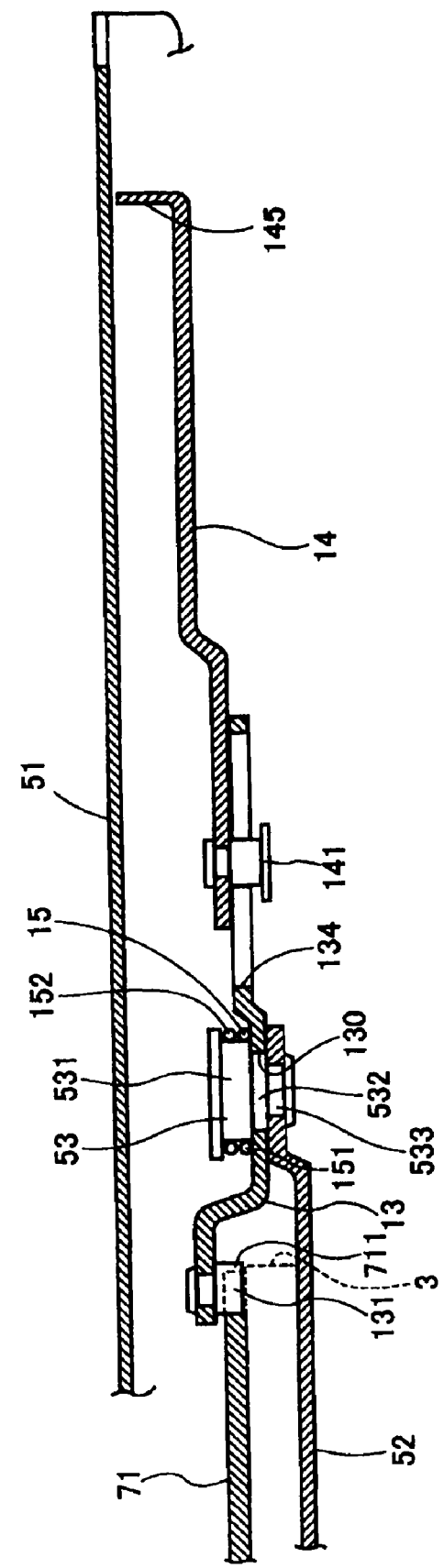
FIG. 14 is a partial sectional view taken along line XIV-XIV in FIG. 12, illustrating the first lock mechanism of the seatback according to the second embodiment.

As illustrated in FIGS. 12 and 14, the intermediate portion 532 of the pin 53, which is secured to the vertical wall member 52 of the securing-side bracket 5, is inserted through and is fitted with a pivot hole 130 of the restraining member 13, thus pivotally supporting the restraining member 13 relative to the securing-side bracket 5. The restraining member 13 includes an engagement portion 131 and an elongated hole 134. The engagement portion 131 is engaged with the protruding portion 711 of the back frame 71. The elongated hole 134 is linked with the releasing member 14. The torsion coil spring 15 is wounded around the pin 53 in the same manner as the first embodiment. The torsion coil spring 15 biases the restraining member 13 in the counterclockwise direction Y in FIG. 12 relative to the securing-side bracket 5. Therefore, the engagement portion 131 of the restraining member 13 is engaged with the protruding portion 711 of the back frame 71 and the seatback 7 is restrained from being pivoted in the counterclockwise direction Y beyond the forward tilted angle α1. A fitting protrusion 141 is provided at a front portion of the releasing member 14 which is an elongated member extending in a front-rear direction of the vehicle. The fitting protrusion 141 is fitted into the elongated hole 134 of the restraining member 13. Still further, a contacting portion 145 is provided at a back portion of the releasing member 14. The contacting portion 145 makes contact with the guiding protrusion 65 of the cushion frame 61. The contacting portion 145 of the releasing member 14 is provided at an area being closer to the retracted position of the seat cushion 6 than the guiding protrusion 65 provided at the back portion of the seat cushion 6 (i.e., farther backward direction B than the guiding protrusion 65) so as to be slidable in the guide hole 510. Other configurations are arranged in the same manner as the first embodiment, and components used in the same manner as the first embodiment will be indicated by the same reference numerals.

In the second embodiment, when moving the seat cushion 6 and the seatback 7 from the corresponding seating position to the corresponding retracted position, the operation lever 40 illustrated in FIG. 12 is pulled upwardly in the same manner as the first embodiment. Then, the seatback 7 is tilted forwardly, and the protruding portion 711 of the back frame 71 and the engagement portion 131 of the restraining member 13 are engaged with each other. Thus, the pivotal movement of the seatback 7 is temporally locked at a position where the protruding portion 711 and the engagement portion 131 are engaged. On the other hand, the seat cushion 6 is guided to the guide hole 510 by the link mechanism 62 and is moved in the backward direction B. At this time, the guiding protrusion 65 of the cushion frame 61 presses the contacting portion 145 of the releasing member 14, which protrudes to the guide hole 510, thus moving the releasing member 14 in the backward direction B. Then, the restraining member 13 linked with the releasing member 14 is pivoted in the counterclockwise direction Y, and the engagement between the engagement portion 131 of the restraining member 13 and the protruding portion 711 of the back frame 71 is released. Therefore, the seatback 7 is tilted further forwardly by the biasing force of the spring and is disposed at the retracted position. Accordingly, the guiding protrusion 65 continues pressing the contacting portion 145 of the releasing member 14 in the backward direction B, and the seat cushion 6 is guided by the guide hole 510. Thus, the seat cushion 6 is moved to the retracted position thereof while surely avoiding an interference with the seatback 7.

Next, when returning the seat cushion 6 and the seatback 7 from the corresponding retracted position to the corresponding seating position, the operator firstly lifts up the seatback 7 being in the parallel state so that the reclining angle of the seatback 7 is larger than the forward tilted angle α1 (i.e., the seatback 7 is arranged in the upright state). Next, the operator moves the seat cushion 6 in the forward direction F. At this time, the contacting portion 145 of the releasing member 14 is always provided at an area being closer to the retracted position of the guiding protrusion 65 (of the seat cushion 6) than the guiding protrusion 65 provided at the back portion of the seat cushion 6 (i.e., farther backward direction B than the guiding protrusion 65) so as to be slidable in the guide hole 510. Therefore, the guiding protrusion 65 of the cushion frame 61 is smoothly moved to the seating position thereof without being interrupted by the contacting portion 145 of the releasing member 14.

As described above, according to the first and second embodiments, when the interference-avoiding mechanism 1 and the link-lock member 2 (second lock mechanism) are released from the corresponding locked states (first and second locked states), the seatback 7 is pivoted forwardly. However, the pivotal movement of the seatback 7 is restrained at the non-interfering position where the seatback 7 does not interfere with the seat cushion 6. On the other hand, when a lock of the seat cushion 6 is released, the seat cushion 6 is moved from the seating position to the retracted position thereof. While being moved from the seating position to the retracted position, the seat cushion 6 presses the releasing member 12, 14 to move, thus releasing a restrained state of the seatback 7. Accordingly, the pivotal movement of the seatback 7 is restarted. On the other hand, the seatback 6 is moved to the position where the seat cushion 6 does not interfere with the seatback 7 while the seatback 7 is moved from the non-interfering position to the retracted position. Therefore, the seatback 7 and the seat cushion 6 are retracted to the corresponding retracted position without interfering with each other. In addition, the seat cushion 6 and the seatback 7 are not connected with each other by means of the link mechanism. Accordingly, even when adjusting the reclining angle of the seatback 7, a position of the seat cushion 6 may not be changed and a seating posture of the operator may not be changed.

Next, a third embodiment of the present invention will be described hereinafter. In the third embodiment, a link structure between the restraining member 13 and the releasing member 14, and the configuration of each of the securing-side bracket 5 and the releasing member 14 are different from those of the first and second embodiment. Additionally, components used in the same manner as the first and second embodiments will be indicated by the same reference numerals as the first and second embodiments.

Figure 16:
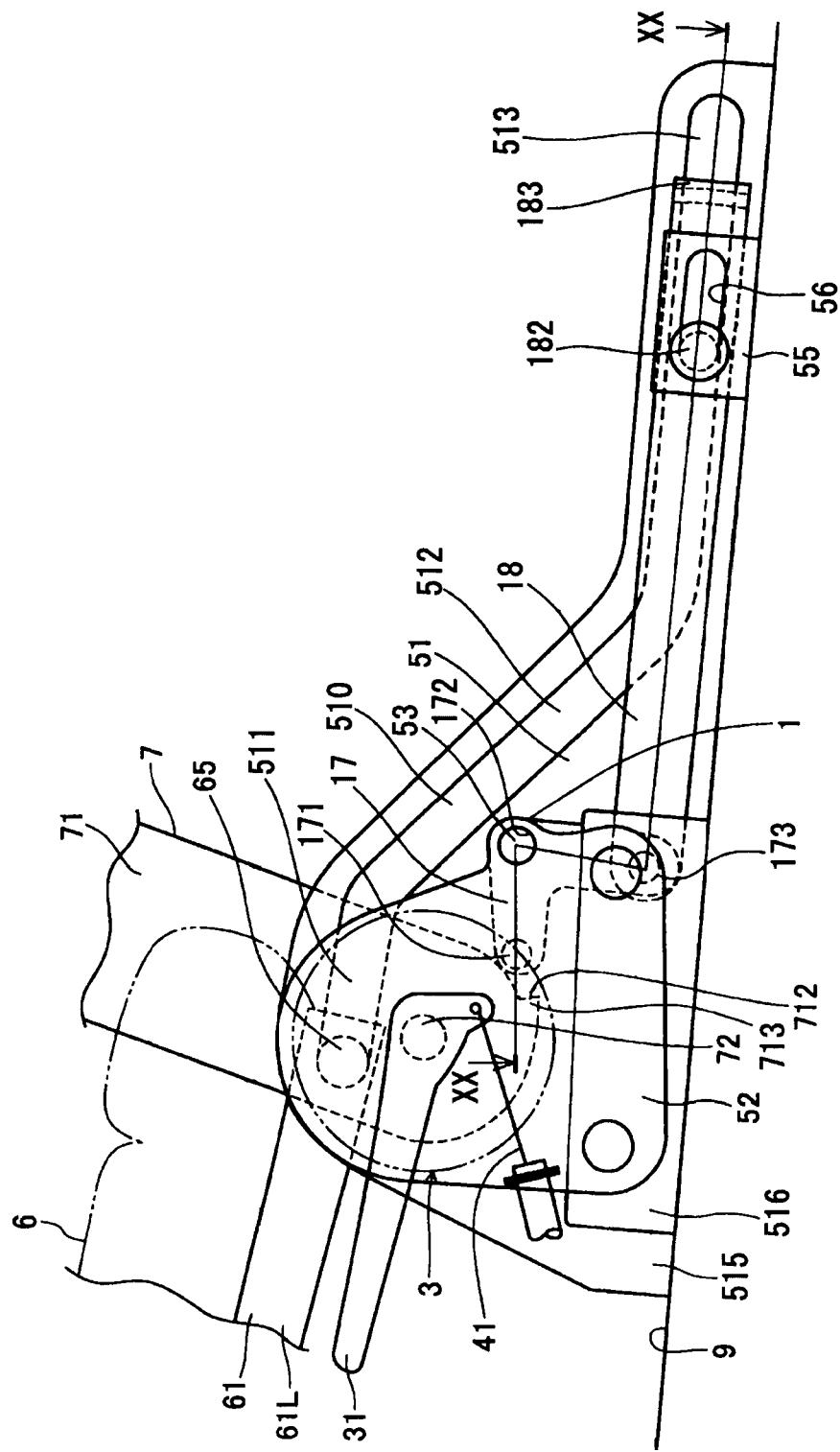
FIG. 16 is a partial enlarged side view illustrating the first lock mechanism of the seatback according to the third embodiment.
Figure 18:
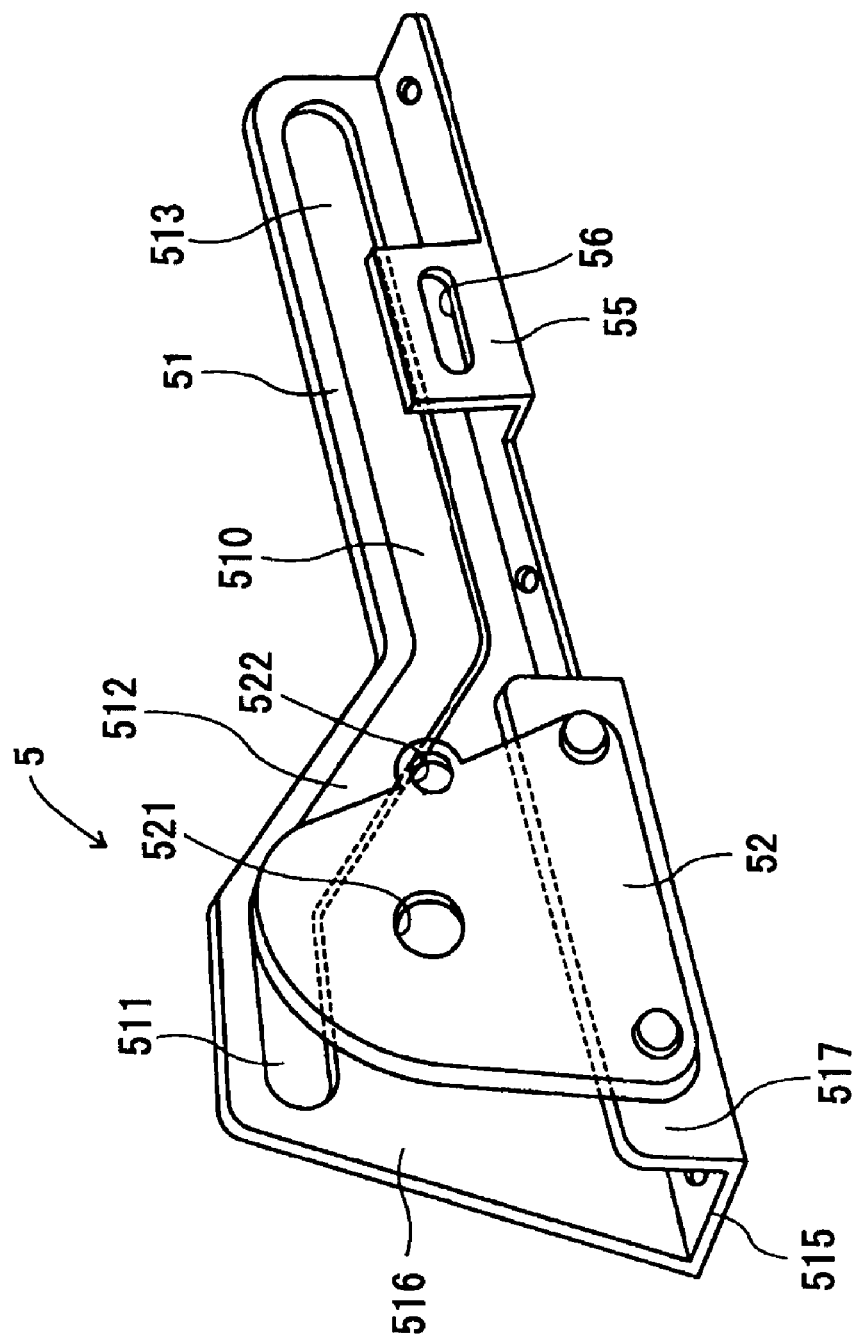
FIG. 18 is a perspective view illustrating a securing-side bracket of the seat apparatus for the vehicle according to the third embodiment.

As best shown in FIGS. 16 and 18, the guide wall member 51 of the securing-side bracket 5 includes the connecting portion 515, which is formed with an elongated hole member 55. The elongated hole member 55 is provided with an elongated hole 56, which extends in parallel with the accommodating portion 513 of the guide hole 510. Longitudinal length of the elongated hole 56 is arranged to be substantially the same with a moving amount of a support shaft 182 of the releasing member 18, the moving amount in the front-rear direction of the of the seat apparatus.

Figure 19:
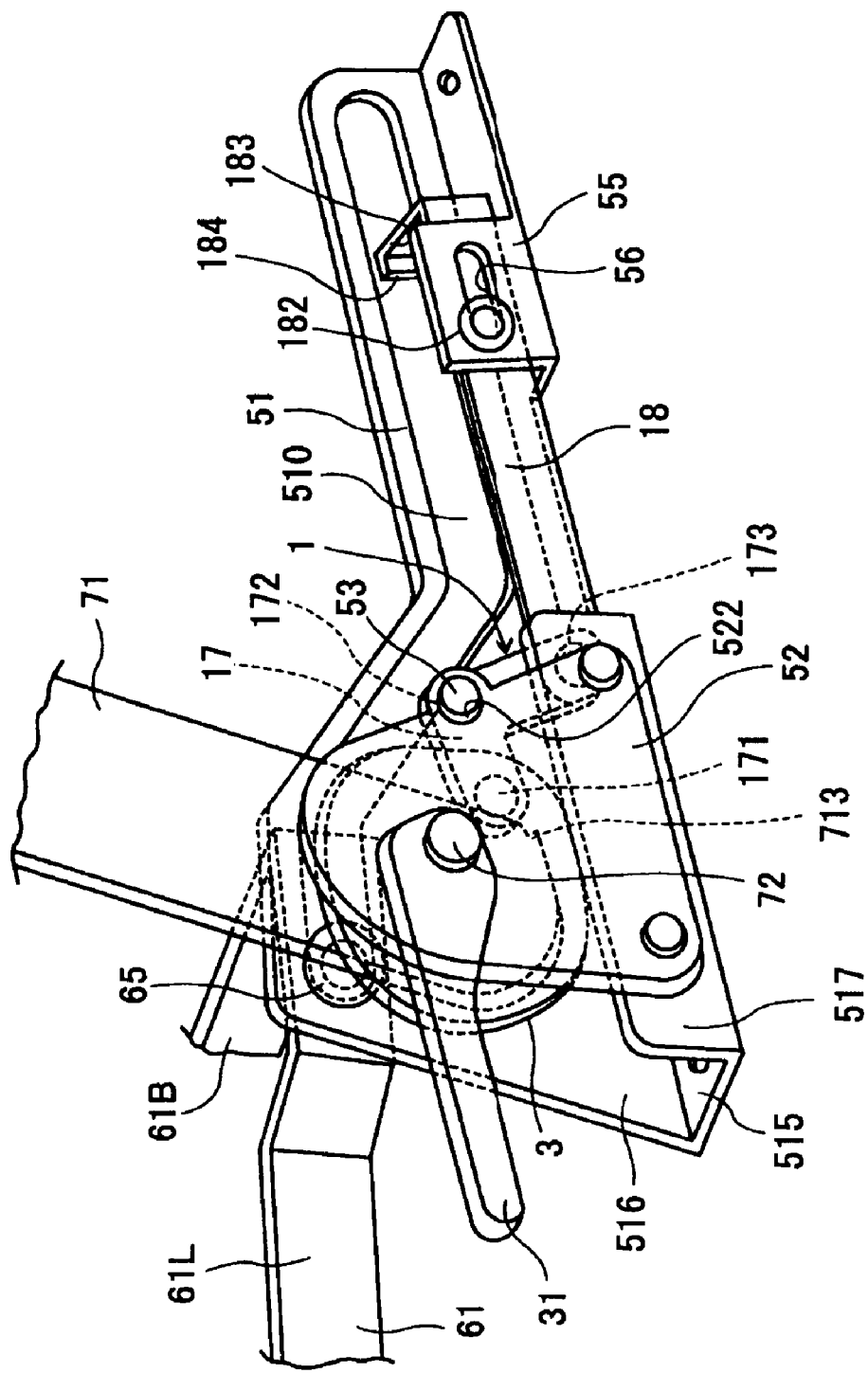
FIG. 19 is a perspective view illustrating the securing-side bracket assembled with the seatback and the seat cushion and accommodating a reclining mechanism and the first lock mechanism, according to the third embodiment.
Figure 20:
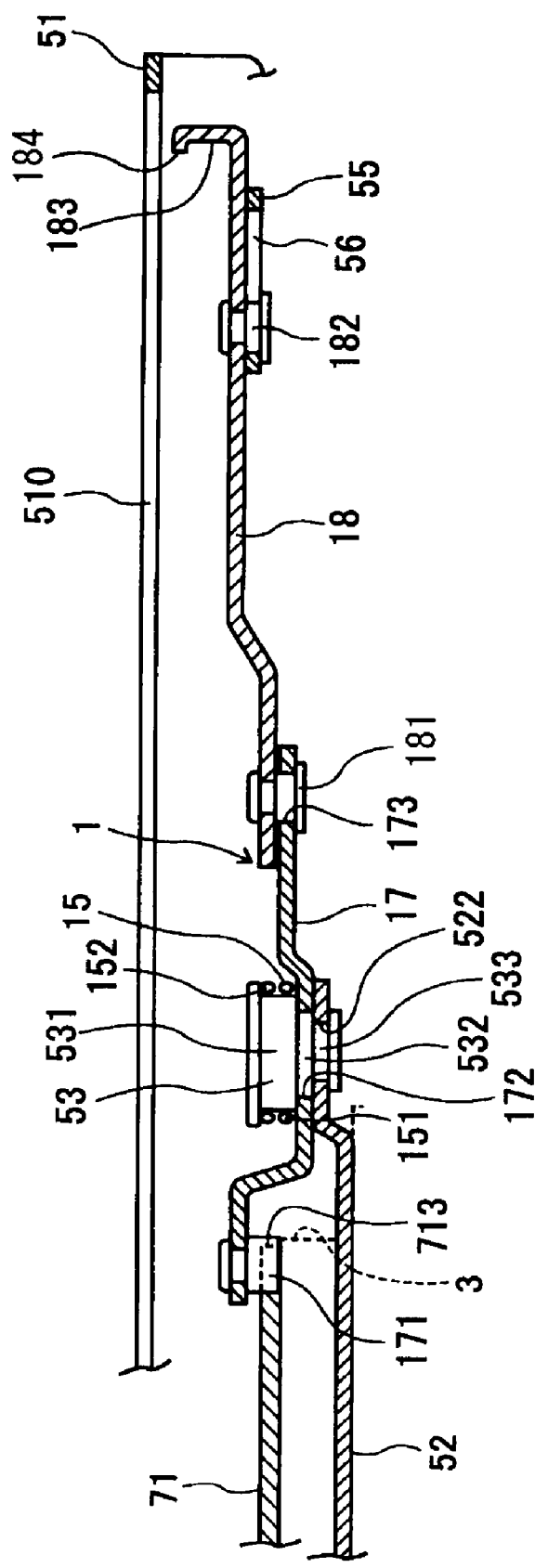
FIG. 20 is a partial cross sectional view taken along line XX-XX in FIG. 16, illustrating the first lock mechanism according to the third embodiment.

As illustrated in FIGS. 19 and 20, the lower portion of the back frame 71, the reclining mechanism 3 and the interference-avoiding mechanism 1 are accommodated in the left securing side bracket 5 provided at the left side L of the seat for the vehicle. The interference-avoiding mechanism 1 includes the restraining member 17, which restrains the seatback 7 to the non-interfering position, and the releasing member 18, which releases the restriction on the pivotal movement of the seatback 7. The restraining member 17 is supported to the vertical wall member 52 with the pin 53. As best shown in FIGS. 18 and 19, the vertical wall member 52 is formed with a first through hole 521 and a second through hole 522. The reclining lever 31 is fitted into the first through hole 521, and the pin 53 is fitted into the second through hole 522. As illustrated in FIG. 20, the pin 53 is formed with the top portion 531, the intermediate portion 532 and the bottom portion 533. The torsion coil spring 15 is wound around the top portion 531 of the pin 53. The intermediate portion 532 of the pin 53 is pivotably fitted into a pivot hole 172 (serving as a pivot portion) of the restraining member 17. The bottom portion 533 of the pin 53 is secured to the vertical wall member 52 of the securing-side bracket 5. The end 151 of the torsion coil spring 15 is securely connected to the restraining member 17 and the other end 152 of the torsion coil spring 15 is securely connected to the top portion 531 of the pin 53. The restraining member 17 of the interference-avoiding mechanism 1 is biased in the clockwise direction X in FIG. 15 (i.e., in the direction towards the viewer referring to FIG. 20) by the torsion coil spring 15 and contacts the lower portion of the back frame 71.

The restraining member 17 is a bell crank, which is pivoted about the pin 53 inserted and fitted into the second through hole 52b of the vertical wall member 52 and the pivot hole 172 formed at the restraining member 17. One end (first end) of the restraining member 17 is formed with an engagement portion 171, and another end (second end) of the restraining member 17 is formed with a connected hole 173. The engagement portion 171 is engaged with an engagement protrusion 713 formed at the back frame 71. The connected hole 173 serves as a connected portion, which is connected to a connecting protrusion 181 formed at the releasing member 18.

As illustrated in FIGS. 19 and 16, the engagement protrusion 713, which protruding from the back frame 71 of the seatback 7, includes a contacting surface 712. The contacting surface 712 is formed to be orthogonal relative to a rotational direction of the engagement portion 171 of the restraining member 17 so as to properly make contact therewith. Accordingly, when restraining the pivotal movement of the seatback 7, the engagement protrusion 713 presses, in a moving direction (the rotational direction) thereof, the engagement potion 171 of the restraining member 17 at the contacting surface 712. Therefore, the engagement protrusion 713 of the back frame 71 is surely engaged with the engagement portion 171 of the restraining member 17. Further, when releasing the restriction on the pivotal movement of the seatback 7, the engagement portion 171 of the restraining member 17 is pivoted in a direction being parallel relative to the contacting surface 712. Hence the engagement portion 171 of the restraining member 17 may be readily released (retracted) from the engagement protrusion 713 of the back frame 71.

Figure 21:
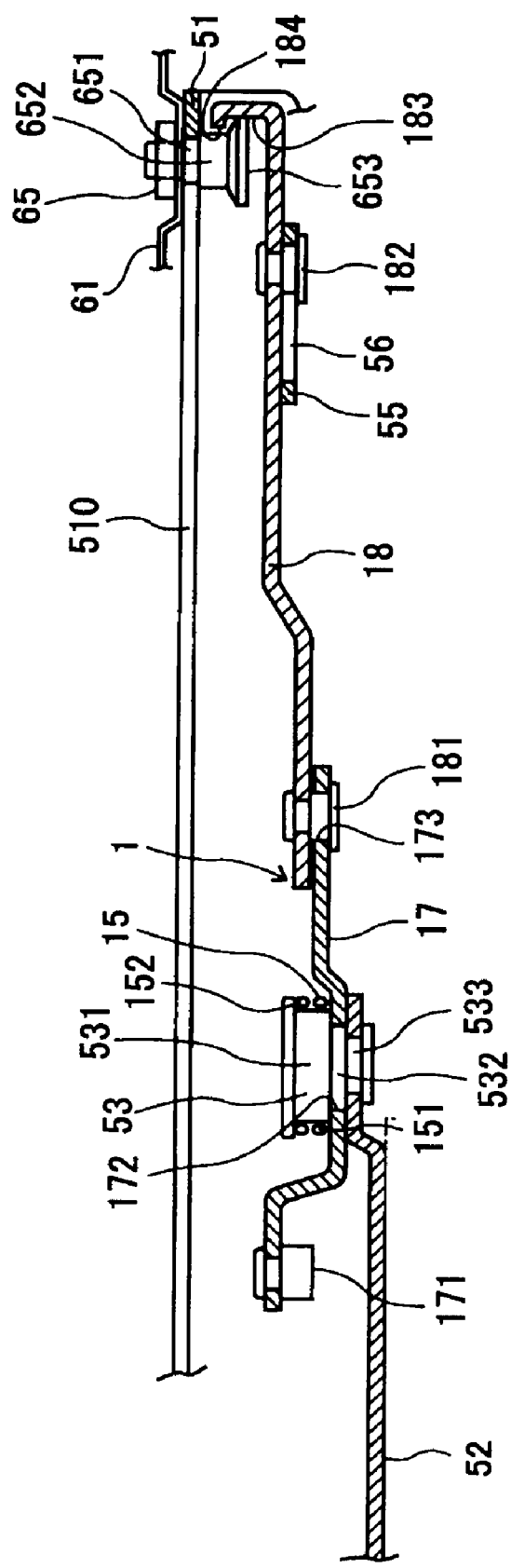
FIG. 21 is a partial cross sectional view taken along line XXI-XXI in FIG. 17, illustrating the first lock mechanism according to the third embodiment.

As best shown in FIGS. 20 and 21, the releasing member 18 is an elongated member extending approximately in parallel with the guide hole 510. The releasing member 18 includes the connecting protrusion 181, the support shaft 182 and a contacting portion 183. The connecting protrusion 181 is provided at one end (first end) of the releasing member 18 and serves as a connecting portion. Further, the connecting protrusion 181 is relatively pivotably fitted into the connected hole 173 of the restraining member 17. The contacting portion 183 is provided at another end (second end) of the releasing member 18 so as to be slidably movable on the movement path for the guiding protrusion 65 of the cushion frame 61. Further, the contacting portion 183 is positioned between the guiding protrusion 65 of the seat cushion 6 and the retracted position of the guiding protrusion 65 so as to be pressed to move by the guiding protrusion 65. In other words, the contacting portion 183 is located at a position being closer to the retracted position of the guiding protrusion 65 than the guiding protrusion 65 (i.e., farther backward direction than the guiding protrusion 65). Accordingly, the contacting portion 183 makes contact with the guiding protrusion 65 of the cushion frame 61 and is moved by being pressed thereby. The support shaft 182 is disposed between the connecting protrusion 181 and the contacting portion 183 and is supported to the elongated hole member 55. The support shaft 182 of the releasing member 18 is slidably movably fitted into the elongated hole 56 of the elongated hole member 55 and serves as a center of a movement of the releasing member 18.

Figure 22:
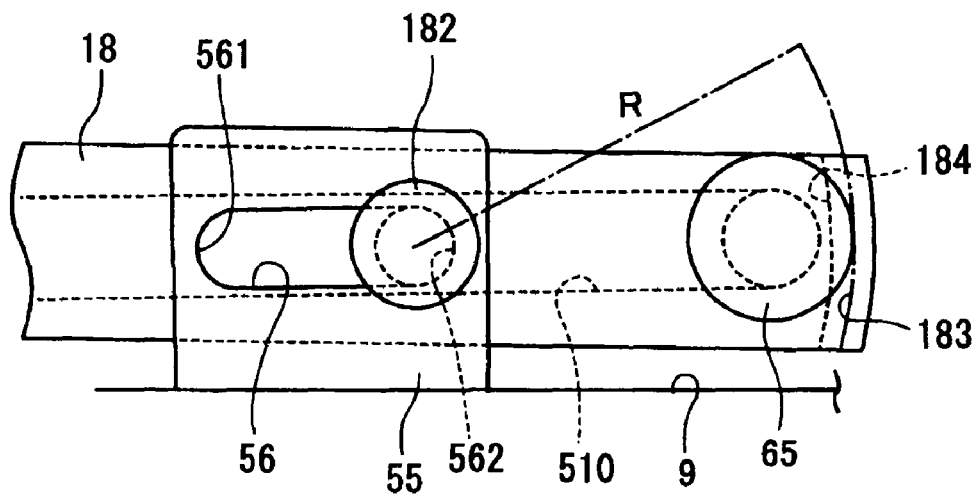
FIG. 22 is an explanatory view illustrating a relation between a contacting portion and a support shaft of a releasing member of the first lock mechanism and an elongated hole and a guide hole of the securing-side bracket.

As shown in FIG. 22, the contacting portion 183 of the releasing member 18 includes an arc shaped surface. The contacting portion 183 is formed as an arced portion (arc shaped surface) having radius R for which the support shaft 182 serves as the center Further, the length of the arced portion of the contacting portion 183 is defined to cover the maximum length of the movement when the releasing member 18 is moved relative to the guiding protrusion 65 of the cushion frame 61.

Figure 15:
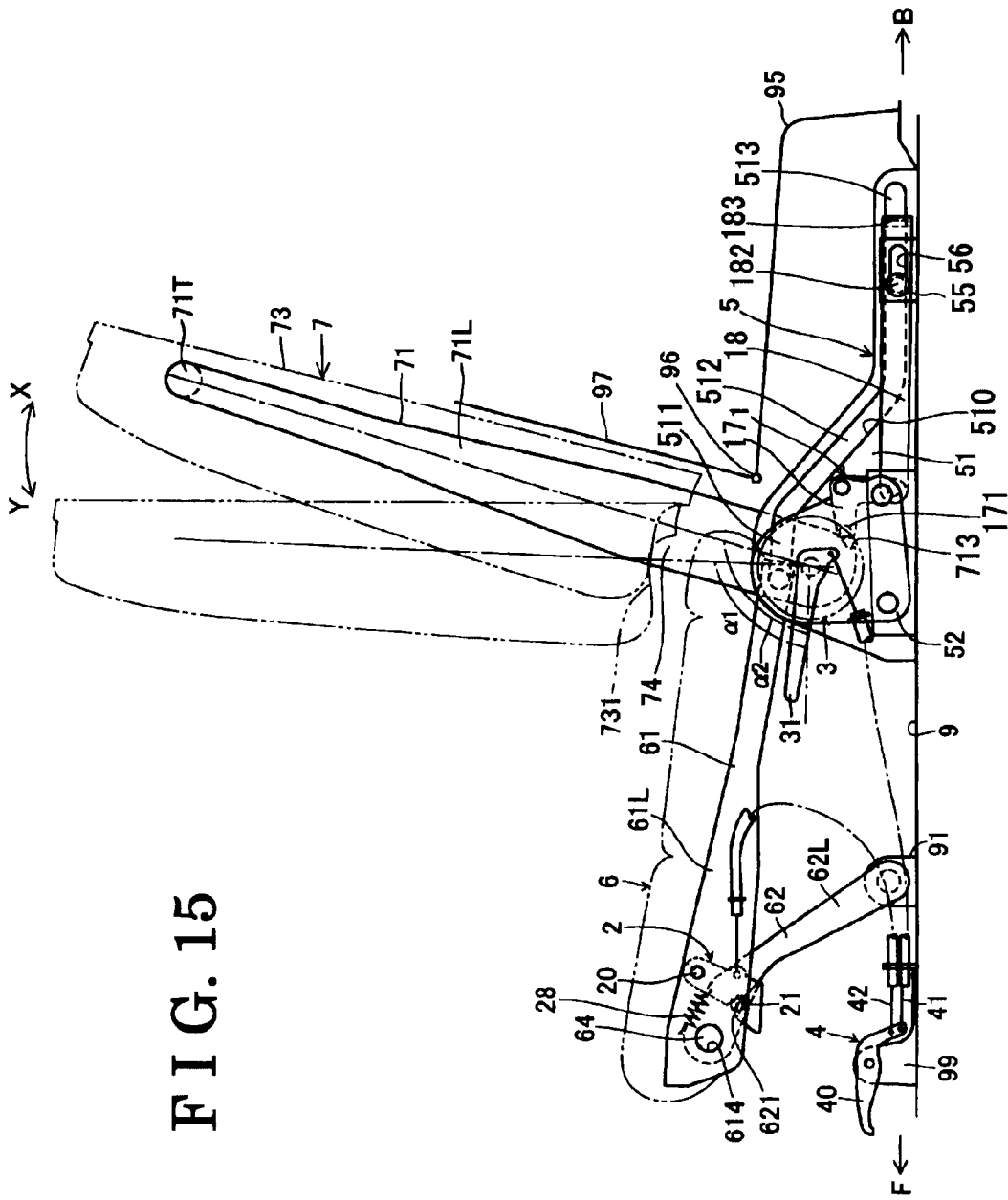
FIG. 15 is a side view illustrating the seat apparatus for the vehicle in a state where each of the seat cushion and the seatback is in the first position, according to a third embodiment.

As illustrated in FIGS. 15 and 22, the contacting portion 183 of the releasing member 18 is moved by being pressed by the guiding protrusion 65 of the cushion frame 61, and therefore the releasing member 18 releases an engagement between the engagement portion 171 of the restraining member 17 and the engagement protrusion 713 of the back frame 71. Thus, the seatback 7 is forwardly tilted from the forward tilted angle α1 corresponding to the non-interfering position. Accordingly, a disposition of the contacting portion 183 of the releasing member 18 when the seatback 7 is retained at the forward tilted angle α1 is set so that the seat cushion 6 is moved to the retracted position in the backward direction B while the seatback 7 is forwardly tilted down from the forward tilted angle α1 to the retracted position corresponding to the parallel state and therefore the seatback 7 does not interfere with the seat cushion 6. The support shaft 182 of the releasing member 18 is locked by a front end 561 of the elongated hole 56, thereby determining the disposition of the contacting portion 183 of the releasing member 18.

Further, as illustrated in FIG. 21, the releasing member 18 further includes a bent end portion 184 (serving as a bent portion), which is formed by bending an end portion of the contacting portion 183 of the releasing member 18 and is locked by a locking head portion 652 of the guiding protrusion 65. The bent end portion 184 is provided for preventing the releasing member 18 from being released from the guiding protrusion 65 of the cushion frame 61, as will be described later. The guiding protrusion 65, which presses the contacting portion 183 of the releasing member 18, is secured to the cushion frame 61 of the seat cushion 6 and includes a neck portion 651, the locking head portion 652 and an enlarged diameter portion 653. The neck portion 651 slides along the guide hole 510. The locking head portion 652 protrudes from the neck portion 651 so as to face the releasing member 18. The enlarged diameter portion 653 is formed at an end portion of the locking head portion 652, and a diameter of the enlarged diameter portion 653 is larger than that of the locking head portion 652. The contacting portion 183 of the releasing member 18 contacts the enlarged diameter portion 653 of the guiding protrusion 65 and is moved by being pressed thereby. At this time, the bent end portion 184 of the releasing member 18 is located at a farther radially inward side of the guiding protrusion 65 than the enlarged diameter portion 653. Therefore, the bent end portion 184 of the releasing member 18 is prevented from being released from the guiding protrusion 65 by the enlarged diameter portion 653.

Figure 17:
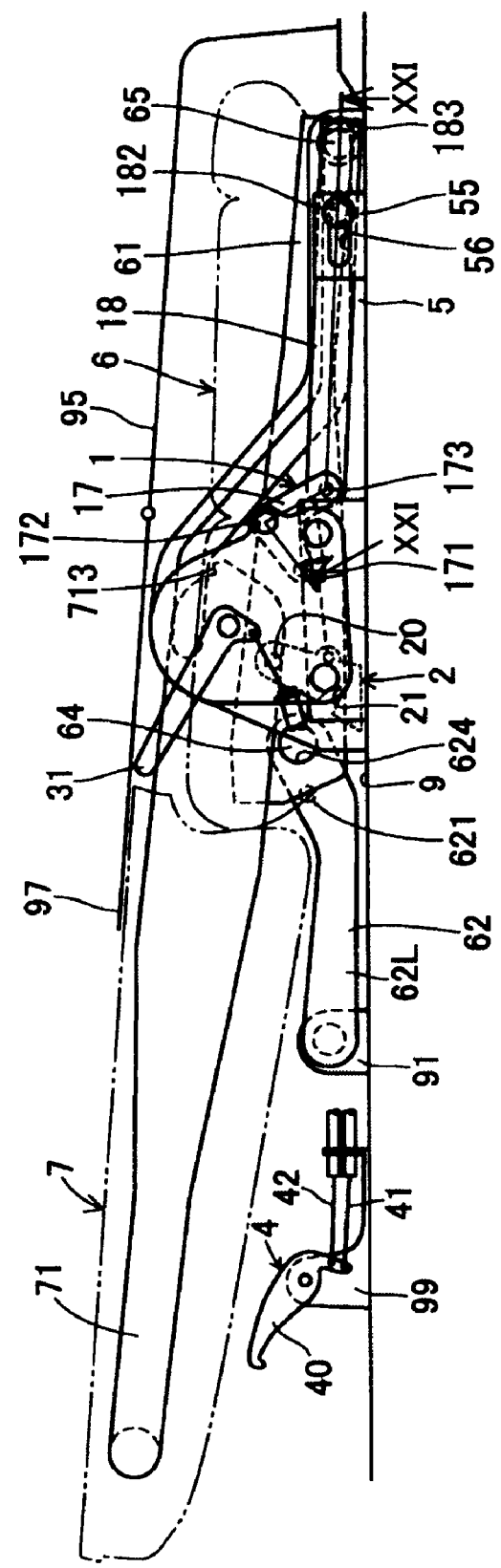
FIG. 17 is a side view illustrating the seat apparatus for the vehicle in a state where each of the seat cushion and the seatback is in the second position, according to a third embodiment.

In the third embodiment, when moving the seat cushion 6 and the seatback 7 from the corresponding seating position to the corresponding retracted position, the seat cushion 6 and the seatback 7 are operated in the same manner as the second embodiment. Then, when the guiding protrusion 65 of the cushion frame 61 reaches the accommodating portion 513 of the guide hole 510, the guiding protrusion 65 makes contact with the contacting portion 183 of the releasing member 18, which protrudes to the accommodating portion 513, and presses the releasing member 18 to the backward direction B. As is illustrated in FIGS. 15 and 21, the releasing member 18 is moved in the backward direction hence rotating the restraining member 17, which is connected to the releasing member 18, in the counterclockwise direction Y against the biasing force of the torsion coil spring 15, the biasing force which acts in the clockwise direction X. Because of such pivotal movement of the restraining member 17, the engagement portion 171 formed at the restraining member 17 passes over the engagement protrusion 713 of the back frame 71 and is released therefrom. Thus, the restriction on the pivotal movement of the seatback 7 at the forward tilted angle α1 (i.e., at the non-interfering position) is released. As best shown in FIG. 17, the seatback 7 is pivoted, by biasing force of a biasing member (not illustrated) acting in the counterclockwise direction, from the forward tilted angle α1 to the retracted position corresponding to the parallel state. While the seatback 7 is pivoted from the forward tilted angle α1 to the retracted position corresponding to the parallel state, the guiding protrusion 65 of the cushion frame 61 is guided by the guide hole 510 thus moving the cushion frame 61 to the non-interfering position of the backward side B. Therefore, the seatback 7 and the seat cushion 6 do not interfere with each other. Additionally, when moving the seat cushion 6 and the seatback 7 from the corresponding retracted position to the corresponding seating position, the seatback 7 and the seat cushion 6 are operated in the same manner as the second embodiment.

Further as best shown in FIG. 17, the seat cushion 6 moves in farther backward direction B as pressing the contacting portion 183 of the releasing member 18. Then, the support shaft 182 of the releasing member 18 reaches a backside end 562 of the elongated hole 56 (see FIG. 22) and is accommodated in the deck board 95 provided on the vehicle floor 9. At this time, the cover 97, which is hinged at the opening end of the deck board 95, is locked, or engaged, at the back portion of the seatback 7. Therefore, the seatback 7, the deck board 95 and the cover 97 form an approximate coplanar surface.

Next, when moving the seatback 7 and the seat cushion 6 from the corresponding retracted position to the corresponding seating position, the operator firstly lifts the seatback 7 being in the parallel state upwardly so that the reclining angle of the seatback 7 is larger than the forward tilted angle α1 (i.e., the seatback 7 is arranged in the upright state). In such upright state of the seatback 7, the pole (not illustrated) of the reclining mechanism 3 is moved radially outwardly and the outer teeth of the pole and the inner teeth of the upper arm are engaged with one another. Thus, the seatback 7 is retained at the seating position where the operator is allowed to be seated by means of the reclining mechanism 3.

Next, the operator pulls (draws) the seat cushion 6 towards the frontward side F. At this time, the operator pulls the seat cushion 6 with a force being greater than the biasing force of the torsion bar 66 inserted through the torque rod 64, the biasing force acting in the backward direction B. Then, the link members 62L and 62R, which are provided at the front portion of the cushion frame 61, are pivoted in the counterclockwise direction Y relative to the cushion frame 61. The guiding protrusion 65 of the cushion frame 61 is guided by the guide hole 510, and therefore the back portion of the cushion frame 61 is moved in the frontward direction F. Accordingly, the seat cushion 6 is moved in the frontward direction F so as to be located at the seating position where the operator is allowed to be seated. Thus, when the seat cushion 6 reaches the seating position thereof, the protruding shaft 621 of the link member 62L at the left side L is engaged with the engagement-recessed portion 21 of the link-lock member 2. This in turn locks the seat cushion 6 to the seating position thereof. In addition, because of pivoting (rotating) force of the restraining member 17, which is generated by the biasing force of the spring (not illustrated) and acts in the clockwise direction X, force (pressure) for returning the releasing member 18 towards the direction of the seating position of the seat cushion 6 acts on the releasing member 18. Therefore, in accordance with a movement of the seat cushion 6 towards the seating position, the contacting portion 183 of the releasing member 18 is moved towards the seating position of the seat cushion 6 with the guiding protrusion 65 of the seat cushion 6. Then, the engagement portion 171 of the restraining member 17 passes over the engagement portion 713 of the back frame 71 and makes contact with a bottom rim of the back frame 71, thus being retained thereat.

As described above, according to the third embodiment, while the seat cushion 6 is moved to the retracted position from the seating position thereof, the releasing member 18 is pressed to move by the guiding protrusion 65 of the cushion frame 61 and rotates the restraining member 17, thus releasing the engagement between the engagement portion 171 of the restraining member 17 and the engagement protrusion 713 of the back frame 71 and rotating the seatback 7 from the forward tilted angle α1 to the retracted position corresponding to the parallel state. At this time, the seat cushion 6 is moved to a position where the seat cushion 6 does not interfere with the seatback 7 while the seatback 7 is pivoted from the forward tilted angle α1 to the retracted position. Accordingly, the seatback 7 and the seat cushion 6 are smoothly retracted to the corresponding retracted position without interfering with each other. Further, the seat cushion 6 and the seatback 7 are not connected with each other. Therefore, the retracted positions of the seat cushion 6 and the seatback 7 may be set flexibly, i.e., a relative positional relation between the seat cushion 6 and the seatback 7 may be flexibly selected in accordance with a form of a guide member and a guiding direction, for example.

When returning the seat cushion 6 towards the seating position, the contacting portion 183 of the releasing member 18 is normally located at the area being closer to the retracted position of the guiding protrusion 65 of the cushion frame 61 than the guiding protrusion 65. Therefore, the guiding protrusion 65 is smoothly moved towards the seating position thereof without being interrupted by the contacting portion 183 of the releasing member 18.

As best shown in FIG. 21, the releasing member 18 includes the connecting protrusion 181, which is connected to the restraining member 17, and the contacting portion 183, which makes contact with the guiding protrusion 65 of the cushion frame 61. Further, the support shaft 182, which is supported to the elongated hole member 55, is disposed between the connecting protrusion 181 and the contacting portion 183. Thus, the releasing member 18 includes a two-point support structure, i.e., one supported point is a position where the connecting protrusion 181 is connected to the restraining member 17, and the other supported point is a position where the support shaft 182 is supported to the elongated whole member 55. Therefore, the releasing member 18 is stably supported and an unstable movement of the releasing member 18 is restrained. In addition, as best shown in FIG. 22, the elongated hole 56 fitted into the support shaft 182 is arranged to be in parallel with a guiding direction of the guide hole 510. Therefore, the releasing member 18 is smoothly moved in the guiding direction along the guide hole 510.

Further as best shown in FIG. 21, the releasing member 18 includes the bent end portion 184, which is formed by bending the end portion of the contacting portion 183. When the contacting portion 183 is pressed to move by the guiding protrusion 65 of the cushion frame 61, the bent end portion 184 is locked farther radially inwardly relative to the guiding protrusion 65 than the enlarged diameter portion 653 of the guiding protrusion 65. Therefore, the bent end portion 184 of the release member 18 is prevented from being released (removed) from the guiding protrusion 65 of the cushion frame 61. Accordingly, the pressing force of the guiding protrusion 65 towards the retracted position thereof is surely transmitted to the restraining member 17. Thus, the restraining member 17 connected to the releasing member 18 is pivoted, thus surely releasing the engagement between the engagement portion 171 of the restraining member and the engagement protrusion 713 of the back frame 71.

Still further, as illustrated in FIGS. 16 and 22, the guiding protrusion 65 of the cushion frame 61 presses to move the contacting portion 183, which is disposed at the second end of the releasing member 18 and moves along the movement path by being guided by the guide hole 510. Because the contacting portion 183 of the releasing member 18 presses to move the protruding portion 65 of the cushion frame 61, the restraining member 17 is pivoted, and the contacting portion 183 of the releasing member 18 is pivotally moved in response to the pivotal movement of the restraining member 17 while tracing an arc shaped locus about the support shaft 182 as a center. Herein, the guide hole 510, which guides the guiding protrusion 65 of the cushion frame 61, is arranged to be in parallel with the elongated hole 56. Therefore, the guiding protrusion of the cushion frame 61 moves to be in parallel with the movement of the support shaft 182. Then, the contacting portion 183 of the releasing member 18 is formed in the arced shape, of which center is the support shaft 182, and the arc shaped surface of the contacting portion 183 corresponds to the arc-shaped locus (pivotal movement locus) on which the contacting portion 183 is oscillated. Therefore, when the contacting portion 183 of the releasing member 18 is pressed to move by the guiding protrusion 65 of the cushion frame 61 while being oscillated on the arc-shaped locus (pivotal movement locus) about the support shaft 182, the guiding protrusion 65 of the cushion frame 61 keeps contacting the contacting portion 183 with a uniform pressing force relative thereto. Accordingly, the releasing member 18 is smoothly pivotally moved and the restraining member 17 is smoothly pivoted.

A length between the releasing support shaft 182 and the contacting portion 183 of the releasing member 18 may be arranged to be shorter than a length between the support shaft 182 and the connecting protrusion 181 of the releasing member 18. In this case, a pivotal moving amount of the contacting portion 183 may be smaller than that of the connecting protrusion 181. Thus, an unstable movement of the contacting portion 183 of the releasing member 18 is efficiently restrained.

Figure 23:
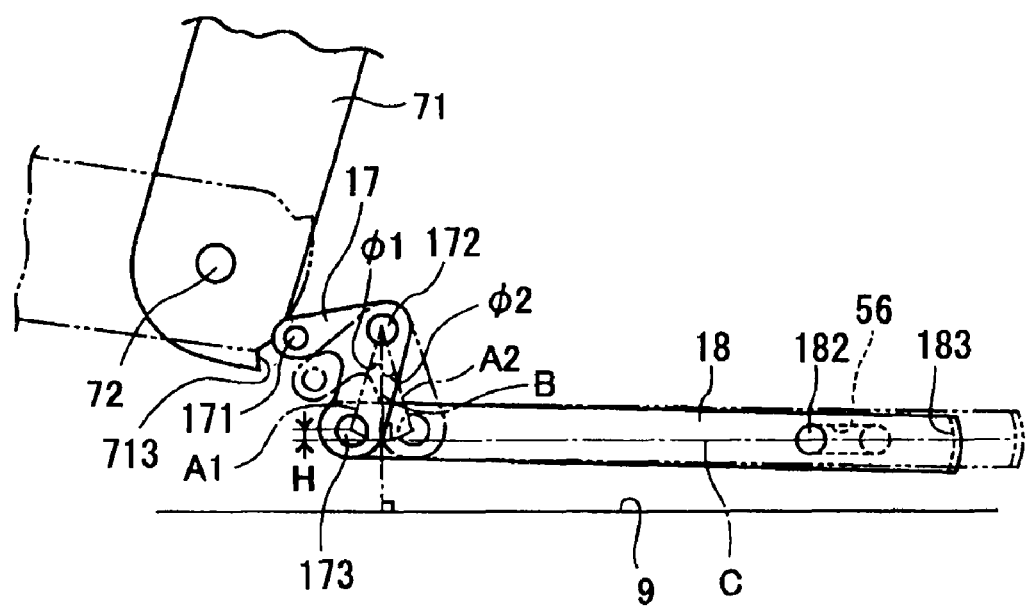
FIG. 23 is an explanatory view illustrating a manner for arranging a restraining member and a releasing member so that a length of the movement of the releasing member is reduced.

In addition, in order to reduce the moving amount of the contacting portion 183, as illustrated in FIG. 23, a first inclined angle φ1 (serving as a first angle) and a second inclined angle φ2 (serving as a second angle) may be arranged to be approximately equal. The first inclined angle φ1 is an angle between a vertical line B, which is vertically lined from the pivot hole 172 of the restraining member 17 down to a longitudinal axial line C lined in a longitudinal direction of the elongated hole 56, and a straight line A1 (serving as a first line), which joins the pivot hole 172 and the connected hole 173 of the restraining member 17 when the seat cushion 6 is located at the seating position thereof. The second inclined angle φ2 is an angle between the vertical line B and a straight line A2 (serving as a second line), which joins the pivot hole 172 and the connected hole 173 of the restraining member 17 when the seat cushion 6 is located at the retracted position thereof. Components illustrated with dotted lines in FIG. 23 indicate a state of those components when the seat cushion 6 is in the retracted position. In the above described state, a fluctuation H of height of the connected hole 173 relative to the longitudinal axial line C of the elongated hole 56, is arranged to be smaller. Accordingly, the length of the movement of the releasing member 18 connected to the connected hole 173 of the restraining member 17 becomes smaller, and the releasing member 18 is efficiently prevented from rattling even further. Additionally, according to the first to third embodiments, the interference-avoiding mechanism 1 is separately provided from the reclining apparatus 3. Alternatively, the interference-avoiding mechanism 1 may be included in, or integrally provided to, the reclining apparatus 3.

Due to the above described structure, when the link-lock member 2 is in the lock-released state (second lock-released state), the seatback 7 is forwardly tilted while the pivotal movement thereof is restrained by the restraining member 11 (13, 17) at the forward tilted angle α1 corresponding to the non-interfering position where the seatback 7 does not interfere with the seat cushion 6 moving between the seating position and the retracted position thereof. On the other hand, when the link-lock member 2 is in the lock-released state, the seat cushion 6 is moved from the seating position to the retracted position thereof. The seat cushion 6 presses the releasing member 12 (14, 18) to move and releases the restrained state of the seatback 7 when the seat cushion 6 is moved between the seating position and the retracted position thereof. Accordingly, the seatback 7 restarts to be pivoted. On the other hand, the seat cushion 6 is moved to the position where the seatback 6 and the seatback 7 do not interfere with each other while the seatback 7 is pivoted from the non-interfacing position (forward tilted angle α1) to the retracted position. Thus, according to the first to third embodiments, the seatback 7 and the seat cushion 6 are retracted to the corresponding retracted position without interfering with each other. In addition, the seat cushion 6 and the seatback 7 are not connected with each other by means of any link mechanism. Accordingly, even when adjusting the reclining angle of the seatback 7, the position of the seat cushion 6 may not be changed and the seating posture of the operator may not be changed.

Further according to the first to third embodiments, the restraining member 11 (13, 17) is pivotably supported relative to the vehicle floor 9 and includes an engagement portion 111 (131, 171) provided to be engaged with and disengaged from the seatback 7 in response to the pivotal movement of the restraining member 11 (13, 17). The releasing member 12 (14, 18) includes a contacting portion 121 (145, 183) protruding to a path for the seat cushion 6 moving between the seating position and the retracted position thereof and being contactable with the seat cushion 6. Further, the releasing member 12 (14, 18) is arranged to move when the seat cushion 6 presses the contacting portion 121 (145, 183) and to rotate the restraining member 11 (13, 17) to release an engagement between the engagement portion 111 (131, 171) of the restraining member 11 (13, 17) and the seatback 7.

Due to the above described structure, the restraining member 11 (13, 17) includes the engagement portion 111 (131, 171) which protrudes to be engageable with and disengageable from the seatback 7. Further, the releasing member 12 (14, 18) includes the contacting portion 121 (145, 183) which protrudes to the movement path for the seat cushion 6 so as to be contactable therewith. The contacting portion 121 (145, 183) of the releasing member 12 (14, 18) is pressed and moved by the movement of the seat cushion 6, hence rotating the restraining member 11 (13, 17). The pivotal movement of the restraining member 11 (13, 17) releases the engagement between the engagement portion 111 (131, 171) of the restraining member 11 (13, 17) and the seatback 7. Thus, the seatback 7 is pivoted and retracted to the retracted position. With such simple structure, the seatback 7 and the seat cushion 6 are retracted to the corresponding retracted position without interfering with each other.

According to the first embodiment, the releasing member 12 is pivotably retained to the restraining member. The locked portion 122 provided at the releasing member 12 contacts the locking portion 113 provided at the restraining member 11 so that the releasing member 12 is restrained from pivoting when the contacting portion 121 of the releasing member 12 is pressed towards the retracted position of the seat cushion 6 while the seat cushion 6 is moved from the seating position to the retracted position thereof. The locked portion 122 of the releasing member 12 is released from the locking portion 113 of the restraining member 11 so that the releasing member 12 is pivoted and the contacting portion 121 of the releasing member 12 is retracted from the path for the seat cushion 6 when the contacting portion 121 of the releasing member 12 is pressed towards the first position of the seat cushion 6 while the seat cushion 6 is moved from the retracted position to the seating position thereof.

Due to the above described structure, when the seat cushion 6 presses the contacting portion 121 of the releasing member 12 towards the retracted position of the seat cushion 6 while being moved from the seating position to the retracted position, the locked portion 122 of the releasing member 12 makes contact with the locking portion 113 of the restraining member 11, hence restraining the pivotal movement of the restraining member 11. When the seat cushion 6 applies the pressing force to move the contacting portion 121 of the releasing member 12 towards the retracted position of the seat cushion 6 while moving from the seating position to the retracted position, the releasing member 12 is pivoted together with the restraining member 11. Accordingly, the contacting portion 121 of the releasing member 12 is retracted from the movement path for the seat cushion 6, and therefore the seat cushion 6 is smoothly moved to the retracted position thereof. Further, the pivotal movement of the restraining member 11 releases the engagement between the engagement portion 111 of the restraining member and the seatback 7, hence rotating the seatback 7 to the retracted position thereof. Next, when the seat cushion 6 applies the pressing force to move the contacting portion 121 of the releasing member 12 towards the seating position of the seat cushion 6 so as to return to the seating position from the retracted position, the locked portion 122 of the releasing member 12 is released from the locking portion 113 of the restraining member 13 and is pivoted. Thus, the contacting portion 121 of the releasing member 12 is retracted from the movement path for the seat cushion 6. Accordingly, the seat cushion 6 is smoothly moved towards the seating position.

Further according to the second and third embodiments, the contacting portion 145 (183) of the releasing member 14 (18) is linked to the restraining member 13 (17) and is always positioned between the seat cushion 6 and the retracted position thereof so as to be slidable along the path for the seat cushion 6.

Due to the above described structure, the releasing member 14 (18) includes the contacting portion 145 (183) which is linked to the restraining member 13 (17) and is positioned at the area being closer to the retracted position of the seat cushion 6 than the seat cushion 6 on the movement path for the seat cushion 6. Therefore, when the seat cushion 6 is moved from the seating position to the retracted position thereof, the contacting portion 145 (183) of the releasing member 14 (18) is pressed by the seat cushion 6 and slides between the seating position to the retracted position of the seat cushion 6 along the movement path for the seat cushion 6 together therewith. Therefore, the releasing member 14 (18) is moved towards the retracted position of the seat cushion 6 and rotates the restraining member 13 (17) linked to the releasing member 14 (18). Thus, the engagement between the engagement portion 131 (171) of the restraining member 13 (17) and the seatback 7 is released. Then, the seatback 7 is allowed to be pivoted and is retracted to the retracted position thereof by the release of the engagement between the engagement portion 131 (171) and the seatback 7. On the other hand, when moving the seat cushion 6 from the retracted position to the seating position, the contacting portion 145 (183) of the releasing member 14 (18) is positioned at the area being closer to the retracted position than the seat cushion 6 in the movement path, so that the seat cushion 6 is moved in a direction to be away from the contacting portion 145 (183) of the releasing member 14 (18). Accordingly, the seat cushion 6 is smoothly moved along the movement path thereof without being interfered by the contacting portion 145 (183) of the releasing member 14 (18).

According to the third embodiment, the seat apparatus for the vehicle further includes the guide wall member 51 adapted to be secured to the vehicle floor side and including a guide hole 510 fitted with the guiding protrusion 65 protruding from the seat cushion 6. The guide wall member 51 defines the movement path for the guiding protrusion 65 moving between the seating position and the retracted position of the guiding protrusion 65. The releasing member 18 includes the elongated shape extending in parallel with the guide hole 510 of the guide wall member 51. The releasing member 18 further includes the connecting portion 181, the contacting portion 183 and the support shaft 182. The connecting portion 181 is provided at the first end of the releasing member 18 and pivotably connects the restraining member 17 relative to the releasing member 18. The contacting portion 183 is provided at the second end of the releasing member 18 so as to be movable along the path for the guiding protrusion 65 of the seat cushion 6 and is positioned between the guiding protrusion 65 of the seat cushion 6 and the retracted position of the guiding protrusion 65 so as to be pressed to move by the guiding protrusion 65. The support shaft 182 is provided between the connecting portion 181 and the contacting portion 183 and supported by the elongated hole member 55. The elongated hole member (55) is secured to the guide wall member (51) and includes an elongated hole (56) extending in a guiding direction of the guide hole (510) of the guide wall member (51) and fitted with the support shaft (182) of the releasing member (18) so as to allow the support shaft (182) to slide in a longitudinal direction of the elongated hole (56).

Herein, the seating position of the guiding protrusion 65 corresponds to the seating position of the seat cushion 6 where the occupant is allowed to be seated on the seat cushion 6. In the same manner, the retracted position of the guiding protrusion 65 corresponds to the retracted position of the seat cushion 6 where the seat cushion 6 and the seatback 7 are retracted relative to the vehicle floor 9.

Due to the above described structure, when the link-lock member 2 is in the lock-released state (second lock-released state), the seatback 7 is forwardly tilted while the pivotal movement thereof is restrained by the restraining member 17 at the forward tilted angle α1 corresponding to the non-interfering position where the seatback 7 does not interfere with the seat cushion 6 moving between the seating position and the retracted position thereof. The releasing member 18 is relatively pivotably connected to the restraining member 17 and includes the contacting potion 183 which is located at the area being closer to the retracted position of the guiding protrusion 65 of the seat cushion 6 than the guiding protrusion 65 moving along the movement path thereof. Therefore, when moving the seat cushion 6 from the seating position to the retracted position, the contacting portion 183 of the releasing member 18 is pressed to move by the guiding protrusion 65 of the cushion frame 61 and slides towards the retracted position along the movement path for the seat cushion 6 together with the guiding protrusion 65 of the cushion frame 61. Accordingly, the releasing member 18 is moved towards the retracted position of the seat cushion 6 and moves the restraining member 17, thus releasing the engagement between the restraining member 17 and the seatback 7. Because of the release of the engagement between the restraining member 17 and the seatback 7, the restriction to the pivotal movement of the seatback 7 is released, hence retracting the seatback 7 to the retracted position.

On the other hand, when the seat cushion 6 is returned to the seating position from the retracted position thereof, the contacting portion 183 of the releasing member 18 is positioned at the area being closer to the retracted position than the guiding protrusion 65 of the seat cushion 6, so that the guiding protrusion 65 is moved towards the seating position, which is an opposite side of the position where the contacting portion 183 of the releasing member 18 is located. Therefore, the guiding protrusion 65 of the seat cushion 6 is smoothly moved along the movement path thereof without being interrupted by the contacting portion 183.

As described above, the seatback 7 and the seat cushion 6 may be retracted, or accommodated, to the corresponding retracted position without interfering with each other. In addition, the seat cushion 6 and the seatback 7 are not connected with each other by any link mechanism. Therefore, even when adjusting the reclining angle of the seatback 7, the position of the seat cushion 6 may not be changed and the seating posture of the operator may not be changed.

Herein, the releasing member 18 includes the connecting protrusion 181 for connecting the restraining member 17 and the contacting portion 183, which makes contact with the guiding protrusion 65 of the seat cushion 6. In addition, the support shaft 182 is disposed between the connecting protrusion 181 and the contacting portion 183. Accordingly, the releasing member 18 is supported at the position where the connecting protrusion 181 is connected to the restraining member 17 and further at the position where the support shaft 182 is supported to the elongated whole member 55. Thus, the releasing member 18 includes the two-point support structure. Therefore, the releasing member 18 is stably supported and an unstable movement of the releasing member 18 is restrained. In addition, as shown in FIG. 22, the elongated hole 56 fitted with the support shaft 182 is arranged to be in parallel with the guiding direction of the guide hole 510. Accordingly, the releasing member 18 is smoothly moved in association with the guiding protrusion 65 guided by the guide hole 510.

Still further according to the third embodiment, the guiding protrusion 65 of the seat cushion 6 includes the neck portion 651, the locking head portion 652 and the enlarged diameter portion 653. The neck portion 651 slides along the guide hole 510 of the guide wall member 51. The locking head portion 652 protrudes from the neck portion 651 to face the releasing member 18. The enlarged diameter portion 653 is provided at the locking head portion 652 at the releasing member side and includes the diameter larger than the diameter of the locking head portion 652. The releasing member 18 includes the bent end portion 184 formed at the contacting portion 183 for being locked to the enlarged diameter portion 653 of the guiding protrusion 65 of the seat cushion 6.

Due to the above described structure, the releasing member 18 includes the bent end portion 184 formed by bending the contacting portion 183. When the contacting portion 183 is pressed to move by the guiding protrusion 65 of the seat cushion 6, the bent end portion 184 is locked at farther radially inwardly than the enlarged diameter portion 653 of the guiding protrusion 65. Therefore, the bent end portion 184 of the release member 18 is prevented from being released from the guiding protrusion 65 of the cushion frame 61. Accordingly, the pressing force of the guiding protrusion 65 towards the retracted position thereof is surely transmitted to the restraining member 17. Thus, the restraining member 17 connected to the releasing member 18 is surely operated, thus releasing the restriction to the pivotal movement of the restraining member 17.

Still further according to the third embodiment, the restraining member 17 rotates about the pin 53 inserted into the pivot hole 172 and includes the engagement portion 171 and the connected portion 173. The engagement portion 171 is formed at the first end of the restraining member 17 and is engaged with the seatback 7. The connected portion 173 is formed at the second end of the restraining member 17 and is connected to the connecting portion 181 of the releasing member 18 so as to be relatively rotatable. The releasing member 18 is pivotally moved about the support shaft 182 in response to the pivotal movement of the restraining member 17. The contacting portion 183 of the releasing member 18 includes the arc shaped portion having the support shaft 182 of the releasing member 18 as the center.

Due to the above described structure, the guiding protrusion 65 of the cushion frame 61 presses to move the contacting portion 183, which is disposed at the second end of the releasing member 18 and moves on the movement path by being guided by the guide hole 510. Because the contacting portion 183 of the releasing member 18 is pressed to move, the restraining member 17 is pivoted, and the contacting portion 183 of the releasing member 18 is pivotally moved while tracing the arc shaped locus about the support shaft 182 as a center. Herein, the guide hole 510, which guides the guiding protrusion 65 of the cushion frame 61, is arranged to be in parallel with the elongated hole 56. Therefore, the guiding protrusion of the cushion frame 61 moves to be in parallel with the movement of the support shaft 182. Then, the contacting portion 183 of the releasing member 18 is formed in the arced shape, of which center is the support shaft 182, and the arc shaped surface of the contacting portion 183 corresponds to the arc-shaped locus (pivotal movement locus) on which the contacting portion 183 is pivotally moved. Therefore, when the contacting portion 183 of the releasing member 18 is pressed to move by the guiding protrusion 65 of the cushion frame 61 while being pivotally moved on the arc-shaped locus (pivotal movement locus) about the support shaft 182, the guiding protrusion 65 of the cushion frame 61 keeps contacting the contacting portion 183 with a uniform pressing force relative thereto. Accordingly, the releasing member 18 is smoothly pivotally moved and the restraining member 17 is smoothly pivoted.

Still further according to the third embodiment, the length between the support shaft 182 of the releasing member 18 and the contacting portion 183 thereof is shorter than the length between the support shaft 182 and the connecting portion 181 of the releasing member 18.

Due to the above described structure, the length between the support shaft 182 and the contacting portion 183 of the releasing member 18 may be arranged to be shorter than the length between the support shaft 182 and the connecting protrusion 181 of the releasing member 18. Therefore, an unstable movement of the contacting portion 183 of the releasing member 18 is efficiently restrained.

Still further according to the third embodiment, the first inclined angle $\phi 1$ between the vertical line B extending from the pivot hole 172 (the pivot portion) to the longitudinal axis of the elongated hole 56 of the elongated hole member 55 and the first line A1 connecting the pivot hole 172 of the restraining member 17 and the connected portion 173 thereof when the seat cushion 6 is in the seating position is equal with the second inclined angle $\phi 2$ between the vertical line B and the second line A2 connecting the pivot hole 172 of the restraining member 17 and the connected portion 173 thereof when the seat cushion 6 is in the retracted position.

Due to the above described structure, the first inclined angle $\phi 1$ and the second inclined angle $\phi 2$ is arranged to be approximately equal. The first inclined angle $\phi 1$ is the angle between the vertical line B, which is vertically lined from the pivot hole 172 of the restraining member 17 down to the longitudinal axial line C lined in the longitudinal direction of the elongated hole 56, and the straight line A1, which joins the pivot hole 172 and the connected hole 173 of the restraining member 17 when the seat cushion 6 is positioned at the seating position. The second inclined angle $\phi 2$ is the angle between the vertical line B and the straight line A2, which joins the pivot hole 172 and the connected hole 173 of the restraining member 17 when the seat cushion 6 is positioned at the retracted position. In such a case, the fluctuation H of the height of the connected hole 173 relative to the longitudinal axial line C of the elongated hole 56, is arranged to be smaller. Accordingly, the length of the movement of the releasing member 18 connected to the connected hole 173 of the restraining member 17 becomes smaller, and an unstable movement of the contacting portion 183 of the releasing member 18 is efficiently restrained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
   a first lock mechanism switching between a first locked state, in which a seatback being pivotable between a first position and a second position of the seatback relative to a vehicle floor is retained at a predetermined reclined position relative to the vehicle floor, and a first lock-released state, in which the seatback is allowed to pivotally move between the first position and the second position thereof relative to the vehicle floor;
   a second lock mechanism switching between a second locked state, in which a seat cushion being movable between a first position and a second position of the seat cushion relative to the vehicle floor is retained at a predetermined position relative to the vehicle floor, and a second lock-released state, in which the seat cushion is allowed to move between the first position and the second position thereof relative to the vehicle floor; and a guide wall member adapted to be secured to a vehicle floor side and including a guide hole fitted with a guiding protrusion protruding from the seat cushion, the guide wall member defining a path for the guiding protrusion moving between a first position and a second position of the guiding protrusion, wherein the first lock mechanism includes a restraining member restraining a pivotal movement of the seatback at a predetermined angle position, at which the seatback does not interfere with the seat cushion moving between the first position and the second position thereof, when the second lock mechanism is in the second lock-released state, the first lock mechanism further includes a releasing member linked to the restraining member and releasing a restriction to the pivotal movement of the seatback by being moved in association with a movement of the seat cushion when the second lock mechanism is in the second lock-released state, the releasing member includes an elongated shape extending in parallel with the guide hole of the guide wall member, a connecting portion provided at a first end thereof and pivotably connecting the restraining member relative to the releasing member, a contacting portion provided at a second end thereof so as to be movable along a path for the guiding protrusion of the seat cushion and positioned between the guiding protrusion of the seat cushion and the second position of the guiding protrusion so as to be pressed to move by the guiding protrusion, and a support shaft provided between the connecting portion and the contacting portion and supported by an elongated hole member, and wherein the elongated hole member is secured to the guide wall member and includes an elongated hole extending in a guiding direction of the guide hole of the guide wall member and fitted with the support shaft of the releasing member so as to allow the support shaft to slide in a longitudinal direction of the elongated hole.

2. A seat apparatus for a vehicle according to claim 1, wherein an occupant is allowed to be seated on the seat cushion when each of the seatback and the seat cushion is positioned in the corresponding first position, and the seat cushion and the seatback are retracted relative to the vehicle floor when each of the seatback and the seat cushion is positioned in the corresponding second position.

3. A seat apparatus for a vehicle according to claim 1, wherein the restraining member is pivotably supported relative to the vehicle floor and includes an engagement portion provided to be engaged with and disengaged from the seatback in response to a pivotal movement of the restraining member, and wherein the contacting portion of the releasing member protrudes to a path for the seat cushion moving between the first position and the second position of the seat cushion and being contactable with the seat cushion, the releasing member is arranged to move when the seat cushion presses the contacting portion and to rotate the restraining member to release an engagement between the engagement portion of the restraining member and the seatback.

4. A seat apparatus for a vehicle according to claim 3, wherein the contacting portion of the releasing member is linked to the restraining member and is always positioned on the side of the second position of the seat cushion so as to be slidable along the path for the seat cushion.

5. A seat apparatus for a vehicle according to claim 1, wherein the first position of the guiding protrusion corresponds to the first position of the seat cushion where an occupant is allowed to be seated on the seat cushion, and the second position of the guiding protrusion corresponds to the second position of the seat cushion where the seat cushion and the seatback are retracted relative to the vehicle floor.

6. A seat apparatus for a vehicle according to claim 1, wherein the guiding protrusion of the seat cushion includes a neck portion sliding along the guide hole of the guide wall member, a locking head portion protruding from the neck portion to face the releasing member, and an enlarged diameter portion provided at the locking head portion at a releasing member side and having a diameter larger than a diameter of the locking head portion, and the releasing member includes a bent portion formed at the contacting portion for being locked to the enlarged diameter portion of the guiding protrusion of the seat cushion.

7. A seat apparatus for a vehicle according to claim 6, wherein the restraining member rotates about a pivot portion provided thereon and includes an engagement portion formed at a first end thereof and engaged with the seatback and a connected portion formed at a second end thereof and connected to the connecting portion of the releasing member so as to be relatively rotatable, the releasing member is pivotally moved about the support shaft in response to a pivotal movement of the restraining member, and wherein the contacting portion of the releasing member includes an arc shaped portion having the support shaft of the releasing member as a center.

8. A seat apparatus for a vehicle according to claim 7, wherein a length between the support shaft of the releasing member and the contacting portion thereof is shorter than a length between the support shaft of the releasing member and the connecting portion thereof.

9. A seat apparatus for a vehicle according to claim 8, wherein a first angle between a vertical line extending from the pivot portion to a longitudinal axis of the elongated hole of the elongated hole member and a first line connecting the pivot portion of the restraining member and the connected portion thereof when the seat cushion is in the first position is equal with a second angle between the vertical line and a second line connecting the pivot portion of the restraining member and the connected portion thereof when the seat cushion is in the second position.

10. A seat apparatus for a vehicle according to claim 7, wherein a first angle between a vertical line extending from the pivot portion to a longitudinal axis of the elongated hole of the elongated hole member and a first line connecting the pivot portion of the restraining member and the connected portion thereof when the seat cushion is in the first position is equal with a second angle between the vertical line and a second line connecting the pivot portion of the restraining member and the connected portion thereof when the seat cushion is in the second position.

11. A seat apparatus for a vehicle according to claim 6, wherein a length between the support shaft of the releasing member and the contacting portion thereof is shorter than a length between the support shaft of the releasing member and the connecting portion thereof.

12. A seat apparatus for a vehicle according to claim 11, wherein a first angle between a vertical line extending from the pivot portion to a longitudinal axis of the elongated hole of the elongated hole member and a first line connecting the pivot portion of the restraining member and the connected portion thereof when the seat cushion is in the first position is equal with a second angle between the vertical line and a second line connecting the pivot portion of the restraining member and the connected portion thereof when the seat cushion is in the second position.

13. A seat apparatus for a vehicle according to claim 1, wherein the restraining member rotates about a pivot portion provided thereon and includes an engagement portion formed at a first end thereof and engaged with the seatback and a connected portion formed at a second end thereof and connected to the connecting portion of the releasing member so as to be relatively rotatable, the releasing member is pivotally moved about the support shaft in response to a pivotal movement of the restraining member, and wherein the contacting portion of the releasing member includes an arc shaped portion having the support shaft of the releasing member as a center.

14. A seat apparatus for a vehicle according to claim 13, wherein a length between the support shaft of the releasing member and the contacting portion thereof is shorter than a length between the support shaft of the releasing member and the connecting portion thereof.

15. A seat apparatus for a vehicle according to claim 14, wherein a first angle between a vertical line extending from the pivot portion to a longitudinal axis of the elongated hole of the elongated hole member and a first line connecting the pivot portion of the restraining member and the connected portion thereof when the seat cushion is in the first position is equal with a second angle between the vertical line and a second line connecting the pivot portion of the restraining member and the connected portion thereof when the seat cushion is in the second position.

16. A seat apparatus for a vehicle according to claim 13, wherein a first angle between a vertical line extending from the pivot portion to a longitudinal axis of the elongated hole of the elongated hole member and a first line connecting the pivot portion of the restraining member and the connected portion thereof when the seat cushion is in the first position is equal with a second angle between the vertical line and a second line connecting the pivot portion of the restraining member and the connected portion thereof when the seat cushion is in the second position.

17. A seat apparatus for a vehicle according to claim 1, wherein a length between the support shaft of the releasing member and the contacting portion thereof is shorter than a length between the support shaft of the releasing member and the connecting portion thereof.

18. A seat apparatus for a vehicle according to claim 17, wherein a first angle between a vertical line extending from the pivot portion to a longitudinal axis of the elongated hole of the elongated hole member and a first line connecting the pivot portion of the restraining member and the connected portion thereof when the seat cushion is in the first position is equal with a second angle between the vertical line and a second line connecting the pivot portion of the restraining member and the connected portion thereof when the seat cushion is in the second position.

* * * * *